United States Patent
Gervais et al.

(10) Patent No.: US 11,543,951 B2
(45) Date of Patent: *Jan. 3, 2023

(54) AUTOMATED TELLER DEVICE HAVING ACCESSIBILITY CONFIGURATIONS

(71) Applicant: The Toronto-Dominion Bank, Toronto (CA)

(72) Inventors: Steven Gervais, Newmarket (CA); Sara Durning, Toronto (CA); Amanda Buchanan, Toronto (CA); Na-Hyun Sophie Park, Toronto (CA); Gregory James Hamilton, Toronto (CA); Miguel Martin C. Florendo, Toronto (CA); Gary Joseph Fernandes, Mississauga (CA); Nikolay Tzankov Markov, Toronto (CA); Bridget Lennon, Cherry Hill, NJ (US); Tristan Rodzen, Norway, ME (US); James Grimmer, Yardley, PA (US)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/212,254

(22) Filed: Mar. 25, 2021

(65) Prior Publication Data

US 2021/0208772 A1 Jul. 8, 2021

Related U.S. Application Data

(63) Continuation of application No. 16/392,905, filed on Apr. 24, 2019, now Pat. No. 10,996,838.

(51) Int. Cl.
*G07F 19/00* (2006.01)
*G06F 3/0489* (2022.01)
(Continued)

(52) U.S. Cl.
CPC ........ *G06F 3/04847* (2013.01); *G06F 3/0485* (2013.01); *G06F 3/0489* (2013.01);
(Continued)

(58) Field of Classification Search
CPC .. G06F 3/04847; G06F 3/0485; G06F 3/0489; G06F 3/165; G07F 19/20; G07F 19/205; G07F 19/206
See application file for complete search history.

(56) References Cited

U.S. PATENT DOCUMENTS 5,297,252 A 3/1994 Becker
6,012,048 A 1/2000 Gustin
(Continued)

FOREIGN PATENT DOCUMENTS

FR 2998700 A1 5/2014
JP 2005149473 6/2005

OTHER PUBLICATIONS

NCR Corporation, "Intelligent ATM Machines: NCR Intelligent Check Deposit Video"—May 4, 2015, YouTube video—https://www.youtube.com/watch?v=2xT96BrVBXo. 2015.
(Continued)

*Primary Examiner* — Daniel Samwel
(74) *Attorney, Agent, or Firm* — Ridout & Maybee LLP

(57) ABSTRACT

An automated teller device having accessibility configurations is disclosed. in one aspect, in response to a setting to enable the accessibility keypad mode, the automated teller device operates a session in an accessibility keypad mode. In the accessibility keypad mode a second set of actions is mapped to the keys of the keypad. The second set of actions is different than a first set of actions mapped to the keys of the keypad in a standard keypad mode. The second set of actions comprises one or more of actions for navigation and input selection of the graphical user interface, actions for
(Continued)

control of audio being reproduced, actions for control of volume of the audio being reproduced, or actions for control of a rate of reproduction of the audio being reproduced.

35 Claims, 24 Drawing Sheets

(51) Int. Cl.
    *G06F 3/04847*     (2022.01)
    *G06F 3/16*     (2006.01)
    *G06F 3/0485*     (2022.01)

(52) U.S. Cl.
    CPC ............ *G06F 3/165* (2013.01); *G07F 19/205* (2013.01); *G07F 19/206* (2013.01)

(56) References Cited

U.S. PATENT DOCUMENTS

| | | |
|---|---|---|
| 6,966,034 B2 | 11/2005 | Narin |
| 7,039,600 B1 | 5/2006 | Meek et al. |
| 7,051,096 B1 | 5/2006 | Krawiec et al. |
| 7,090,122 B1 | 8/2006 | Warren et al. |
| 7,225,156 B2 | 5/2007 | Fisher et al. |
| 7,229,007 B1 | 6/2007 | Swaine |
| 7,570,646 B2 | 8/2009 | Li et al. |
| 7,637,421 B1* | 12/2009 | Trocme .................. G07F 19/20 |
| | | 235/379 |
| 7,644,041 B1 | 1/2010 | Schultz et al. |
| 7,657,473 B1 | 2/2010 | Meffie |
| 7,715,377 B2 | 7/2010 | Walker |
| 7,753,772 B1 | 7/2010 | Walker |
| 8,408,455 B1 | 4/2013 | Taylor |
| 8,608,057 B1 | 12/2013 | Crews et al. |
| 8,688,692 B2 | 4/2014 | Abramson |
| 9,004,353 B1 | 4/2015 | Black |
| 9,038,188 B2 | 5/2015 | Adams et al. |
| 9,196,111 B1 | 11/2015 | Newman et al. |
| 9,292,840 B1 | 3/2016 | Velline et al. |
| 9,589,256 B1 | 3/2017 | Thomas |
| 9,953,367 B2 | 4/2018 | Del Vecchio et al. |
| 9,984,411 B1 | 5/2018 | Velline et al. |
| 10,078,769 B2 | 9/2018 | Bouteleux |
| 10,332,201 B1 | 6/2019 | Kunz |
| 10,535,047 B1 | 1/2020 | Thomas et al. |
| 2001/0014881 A1 | 8/2001 | Drummond et al. |
| 2001/0044747 A1 | 11/2001 | Ramachandran et al. |
| 2002/0196238 A1 | 12/2002 | Tsukada et al. |
| 2003/0033249 A1 | 2/2003 | Ingram et al. |
| 2003/0040850 A1 | 2/2003 | Najmi |
| 2003/0046234 A1 | 3/2003 | Takadachi |
| 2003/0105710 A1 | 6/2003 | Barbara et al. |
| 2003/0217005 A1 | 11/2003 | Drummond et al. |
| 2004/0066374 A1 | 4/2004 | Holloway et al. |
| 2004/0108376 A1 | 6/2004 | Witherspoon |
| 2004/0133516 A1 | 7/2004 | Buchanan |
| 2004/0215566 A1 | 10/2004 | Meurer |
| 2005/0035193 A1 | 2/2005 | Gustin |
| 2005/0132408 A1* | 6/2005 | Dahley .................. H04N 7/142 |
| | | 348/E7.087 |
| 2005/0209958 A1 | 9/2005 | Michelsen et al. |
| 2005/0233797 A1 | 10/2005 | Gilmore et al. |
| 2005/0240943 A1 | 10/2005 | Smith |
| 2006/0038004 A1* | 2/2006 | Rielly ................ G06Q 30/0207 |
| | | 235/379 |
| 2006/0139312 A1 | 6/2006 | Sinclair et al. |
| 2006/0163341 A1 | 7/2006 | Tulluri et al. |
| 2006/0261140 A1 | 11/2006 | Tulluri |
| 2007/0181676 A1 | 8/2007 | Mateen et al. |
| 2007/0215686 A1 | 9/2007 | Matson |
| 2008/0040265 A1 | 2/2008 | Rackley, III et al. |
| 2008/0106519 A1* | 5/2008 | Murray ................ G06F 3/0488 |
| | | 345/169 |
| 2008/0135609 A1 | 6/2008 | Dcosta |
| 2009/0108015 A1 | 4/2009 | Kreamer |
| 2009/0212104 A1 | 8/2009 | Smith et al. |
| 2010/0031021 A1 | 2/2010 | Arnold et al. |
| 2010/0255885 A1 | 10/2010 | Lee et al. |
| 2010/0325046 A1 | 12/2010 | Milne |
| 2011/0022484 A1 | 1/2011 | Smith et al. |
| 2011/0113328 A1 | 5/2011 | Marzke |
| 2011/0184865 A1 | 7/2011 | Mon et al. |
| 2011/0251956 A1 | 10/2011 | Cantley et al. |
| 2011/0288997 A1 | 11/2011 | McBride |
| 2012/0074217 A1 | 3/2012 | Block et al. |
| 2012/0173348 A1 | 7/2012 | Yoo |
| 2012/0197797 A1 | 8/2012 | Grigg et al. |
| 2012/0223136 A1 | 9/2012 | Drummond |
| 2012/0286034 A1 | 11/2012 | Smith |
| 2012/0330769 A1 | 12/2012 | Arceo |
| 2013/0018787 A1 | 1/2013 | Andrews et al. |
| 2013/0212015 A1 | 8/2013 | Anthony et al. |
| 2013/0264384 A1 | 10/2013 | Wadia |
| 2014/0331131 A1 | 11/2014 | DeSellem |
| 2014/0331189 A1* | 11/2014 | Lee ........................ G07F 19/205 |
| | | 715/863 |
| 2014/0372268 A1 | 12/2014 | Hazam |
| 2015/0046794 A1 | 2/2015 | Cardno |
| 2015/0066761 A1* | 3/2015 | Chang ................ G06Q 20/1085 |
| | | 705/43 |
| 2015/0149963 A1 | 5/2015 | Chang et al. |
| 2015/0178730 A1 | 6/2015 | Gleeson et al. |
| 2015/0186857 A1 | 7/2015 | Swinfen |
| 2015/0199681 A1 | 7/2015 | Salgado et al. |
| 2015/0212677 A1 | 7/2015 | Dunne et al. |
| 2015/0262183 A1 | 9/2015 | Gervais |
| 2015/0301722 A1 | 10/2015 | Warnitz |
| 2016/0086145 A1 | 3/2016 | Tsutsui |
| 2016/0098692 A1 | 4/2016 | Johnson et al. |
| 2016/0098904 A1 | 4/2016 | Choudhury et al. |
| 2016/0180304 A1 | 6/2016 | Carriles et al. |
| 2016/0364729 A1 | 12/2016 | Ruparelia et al. |
| 2017/0003856 A1 | 1/2017 | Mande et al. |
| 2017/0006013 A1 | 1/2017 | Mande et al. |
| 2017/0006028 A1 | 1/2017 | Tunnell et al. |
| 2017/0006114 A1 | 1/2017 | Mande et al. |
| 2017/0039818 A1 | 2/2017 | Lee |
| 2017/0091731 A1 | 3/2017 | Nelson et al. |
| 2017/0168691 A1 | 6/2017 | Johansson |
| 2017/0352021 A1 | 12/2017 | Szeto et al. |
| 2018/0039616 A1 | 2/2018 | Shalit et al. |
| 2018/0096302 A1 | 4/2018 | Tseretopoulos et al. |
| 2018/0114004 A1 | 4/2018 | Hamid |
| 2018/0225659 A1 | 8/2018 | Yamasaki et al. |
| 2018/0268414 A1 | 9/2018 | Chung et al. |
| 2018/0268637 A1 | 9/2018 | Kurian et al. |
| 2019/0012882 A1 | 1/2019 | Poueriet |
| 2019/0073663 A1 | 3/2019 | Jamkhedkar et al. |
| 2019/0096196 A1 | 3/2019 | Cifarelli |

OTHER PUBLICATIONS

Emirates NBD, "How to deposit Cheque into CDMs", https://fwww.youtube.com/watch?v=c4rhspQBKas, Aug. 30, 2016. 2016.
SewGenius, "How to do a check deposit on a Suntrust Bank ATM", https://www.youtube.com/watch?v=puxovvQkfYk, Aug. 27, 2017. 2017.
Mengxing Zhang et al., A Survey on Human Computer Interaction Technology for Financial Terminals; pp. 174-177 2012.
TD Bank, "How Do I Change My PIN Number", TD Bank website, employee Colleen B on Mount Laurel on Sep. 10, 2014. 2014.
Forward Bank, "Smart Deposit ATM Demo", Oct. 31, 2014, YouTube video—https://www.youtube.com/watch? v=aoHoD5Evot4. 2014.
Kumar, "How to Transfer Money to Other Bank Account Through CDM (Cardless)", Accounting Education, published on Dec. 21, 2015. 2015.
EMV Migration Forum, "Implementing EMV at the ATM: PIN Change at the ATM, Version 1.0", An EMV Migration Forum White Paper, Mar. 2015. 2015.
Rathaur, "How to Deposit Money in ATM", Mar. 23, 2016, YouTube video—https://youtube.com/watch?v=RQbjXtJVJ_o. 2016.

(56) References Cited

OTHER PUBLICATIONS

Final Rejection; U.S. Appl. No. 16/152,113, filed May 28, 2020.
Final Rejection; U.S. Appl. No. 16/392,905, filed Oct. 28, 2020.
Notice of Allowance; U.S. Appl. No. 16/392,905 dated Jan. 12, 2021.
Office Action; CA Application No. 3019824 dated Feb. 2, 2021.
Isa Tala, Designing Haptic Clues for Touchscreen Kiosks, MS Thesis, University of Tampere, https://tampub.uta.fi/bitstream/handle/10024/99652/GRADU-1472825234.pdf?sequence=1&isAllowed=y 2016.
Leah Findlater and Joanna McGrenere, Beyond performance: Feature awareness in personalized interfaces, International Journal of Human-Computer Studies 68.3 (2010): 121-137, http://faculty.washington.edu/leahkf/pubs/IJHCS%20personalization%20author%20copy.pdf 2010.
Ahmed Farooq, Haptics in Kiosks and ATMs for the Disabled, University of Tampere, http://tampub.uta.fi/bitstream/handle/10024/81075/gradu03909.pdf;sequence=1 2009.
Office Action; U.S. Appl. No. 16/152,066 dated Nov. 12, 2019.
Lee, "ATM UI Prototyping/ Renovation", slideshare, drafted Jul. 6, 2011, uploaded Jul. 28, 2011 Jul. 28, 2011.
Wikipedia—IP Fragmentation 2020.
Wikipedia—Packet Switching 2020.
LiveAction: What is a Network Packet? 2020.
Office Action; U.S. Appl. No. 16/152,074 dated Oct. 2, 2019.
Office Action; U.S. Appl. No. 16/152,113; dated Jan. 2, 2020.
Office Action; U.S. Appl. No. 16/152,027 dated Jan. 22, 2020.
Office Action; U.S. Appl. No. 16/152,083 dated Jan. 30, 2020.
Office Action; U.S. Appl. No. 16/152,074 dated Feb. 10, 2020.
Advisory Action; U.S. Appl. No. 16/152,074 dated Apr. 17, 2020.
Office Action; U.S. Appl. No. 16/152,054 dated Apr. 6, 2020.
Final Rejection; U.S. Appl. No. 16/152,066 dated Apr. 8, 2020.
Advisory Action; U.S. Appl. No. 16/152,113 dated Aug. 17, 2020.
Final Rejection; U.S. Appl. No. 16/152,027 dated Jul. 16, 2020.
Final Rejection, U.S. Appl. No. 16/152,083 dated Jul. 9, 2020.
Notice of Allowance; U.S. Appl. No. 16/152,066 dated Jul. 1, 2020.
Advisory Action; U.S. Appl. No. 16/152,083 dated Sep. 28, 2020.
Advisory Action; U.S. Appl. No. 16/152,027 dated Sep. 29, 2020.
Office Action; U.S. Appl. No. 16/152,113 dated Nov. 3, 2020.
Final Rejection; U.S. Appl. No. 16/152,054 dated Nov. 3, 2020.
Coconuts KL 2014 "Withdrawal systems: GST to be applied to ATM and banking services" 2014.
Office Action; U.S. Appl. No. 16/152,074 dated Sep. 9, 2020.
Office Action; U.S. Appl. No. 16/152,143; dated Sep. 11, 2020.
Office Actiion; U.S. Appl. No. 16/392,905 dated Jun. 16, 2020.
Prasanna Zore, Things you can do with your ATM Card Feb. 21, 2007.
SELCO Community Credit Union, "How to Deposit Checks in Our Upgraded ATMs", Feb. 7, 2013, YouTube Video—https://www.youtube.com/watch?v=MxfjdDcRGi8. 2013.
ShinyPress, Using a Bank Machine (ATM) to Make a Withdrawal, video on YouTube, published on Jul. 8, 2013. 2013.
TheFinancialBrand, Wells Fargo's ATMs know you better Feb. 20, 2013.
J.D. Biersdorfer Q and A: Scanning Checks at the ATM; the new york times blog May 8, 2013.
HowToBank, "How to ATM Change PIN", video on YOUTUBE, published on Feb. 27, 2014. 2014.

TD Canada Trust, "Ways to Bank—Green Machine ATM—How to Transfer Between Acocunts", company website, accessed Aug. 18, 2014. 2014.
NCR Corporation (https://www.youtube.com/watch?v+1Wh7kZ70piQ), "Intelligent ATM Machines: NCR Intelligent Dash Deposit"—May 4, 2015. 2015.
Lego Bank, "How to Lodge Money in a Cash and Cheque Lodgement ATM", Feb. 8, 2015, YouTube video—https://www.youtube.com/watch?v=fvw0mhemUYs. 2015.
Pinay Investor, "How to Check Transactions in BPI Express Online", Nov. 2, 2015, YouTube video—https://www.youtube.com/watch?v=KD2SWCs7nYA. 2015.
Scholl, "Bank of America ATM Deposit", video on YouTube, published Oct. 6, 2016. 2016.
Scholl, "US Bank ATM Check Deposit", Mar. 30, 2015, YouTube video—https://youtube.com/watch?v=4oxq0tgwpL4. 2015.
Scholl, "How easy is it to Deposit money into the Bank of America ATM", https://www.youtube.com/watch? v=sRdyalenYZQ, Oct. 1, 2016. 2016.
NCR Corporation, NCR SelfServ 80 Series ATM Family, https://www.youtube.com/watch?v=7MICCIn9RO0, Oct. 18, 2017. 2017.
BhattiXpert, "How to Use ATM Machine HBL (2017))", video on YouTube, published on Dec. 29, 2016. 2016.
Iucadp, "Concept of ATM", stock image on CANSTOCKPHOTO, published on Mar. 3, 2016. 2016.
NCR Corporation, "NCR Scalable Deposit Modile (SDM) Banking Software Video", https://www.youtube.com/watch?v=qQWKk3Rd-K8, Nov. 13, 2017. 2017.
Firstbankok, "FirstBank ATM Deposit", https://www.youtube.com/watch?v=594jnG4tgpE, Nov. 13, 2017. 2017.
Thunder Tech Pro, "How to Use ATM. Simple Video. Step by Step Full Procedure", video on YouTube, published on Apr. 22, 2017. 2017.
Regions Bank, "Regions Depositsmart ATMs | Regions Bank", https://www.youtube.com/watch?v=2A0i25M9IW0, Sep. 26, 2017. 2017.
NCR Corporation "NCR SelfServ 80 Series ATM Family—A new era for ATMs" Oct. 18, 2017.
Brouillette, "Making ADA Compliance a Priority", Advanced Kiosks, published May 15, 2018. 2018.
Office Action—U.S. Appl. No. 17/212,254 dated May 11, 2022.
G. Mujtaba and T. Mahmood, "Adaptive Automated Teller Machines—Part II," 2011 International Conference on Information and Communication Technologies, Karachi, Pakistan, 2011, pp. 1-6, doi: 10.1109/ICICT.2011.5982541 2011.
Office Action; U.S. Appl. No. 16/152,074 dated Mar. 19, 2021.
Office Action; U.S. Appl. No. 16/152,027 dated Mar. 19, 2021.
NCR Corporation, "NCR Scalable Deposit Module: Fast Cash and Check Deposit Video", May 23, 2011, https://www.youtube.com/watch?v+O_hLwYOiG-k) (Year: 2011) 2011.
Office Action; U.S. Appl. No. 16/152,083 dated Apr. 5, 2021.
Clarydan Clara ("NCR ATM—SCPM Check Deposit", Nov. 20, 2013, https://www.youtube.com/watch?v=IvGB99NFbl8) (Year: 2013) 2013.
Peninsula Credit Union ("How to Make a Cheque Deposit", Jul. 30, 2018,https://www.youtube.com/watch?v=05t2DzLEVGA) 2018.
Office Action; U.S. Appl. No. 16/152,113 dated Feb. 22, 2021.
BAC Community Bank ("Merchant Remote Deposit (MRD) Quick Guide", Apr. 10, 2017, version 5.8.7) (Year: 2017) Apr. 10, 2017.
Office Action; CA Application No. 3040937 dated Apr. 28, 2022.

* cited by examiner

AUTOMATED TELLER DEVICE HAVING ACCESSIBILITY CONFIGURATIONS

RELATED APPLICATION DATA

The present application is a continuation of U.S. patent application Ser. No. 16/392,905, filed Apr. 24, 2019, the content of which is incorporated herein by reference.

TECHNICAL FIELD

The present disclosure is related to an automated teller device, and more particularly, to an automated teller device having accessibility configurations.

BACKGROUND

An automated teller device may enable a user to perform a variety of actions related to a user account through a user interface. The user interface may comprise of a keypad comprising a plurality of keys, a speaker, and a display providing a graphic user interface. The provision of accessibility features is an important feature of automated teller devices. However, the accessibility features of existing automated teller devices are limited in terms of customization, are difficult to use, and are difficult to implement in an effective user interface. Accordingly, there remains a need for an improved automated teller device having accessibility configurations.

DESCRIPTION OF EXAMPLE EMBODIMENTS

Figure 1:
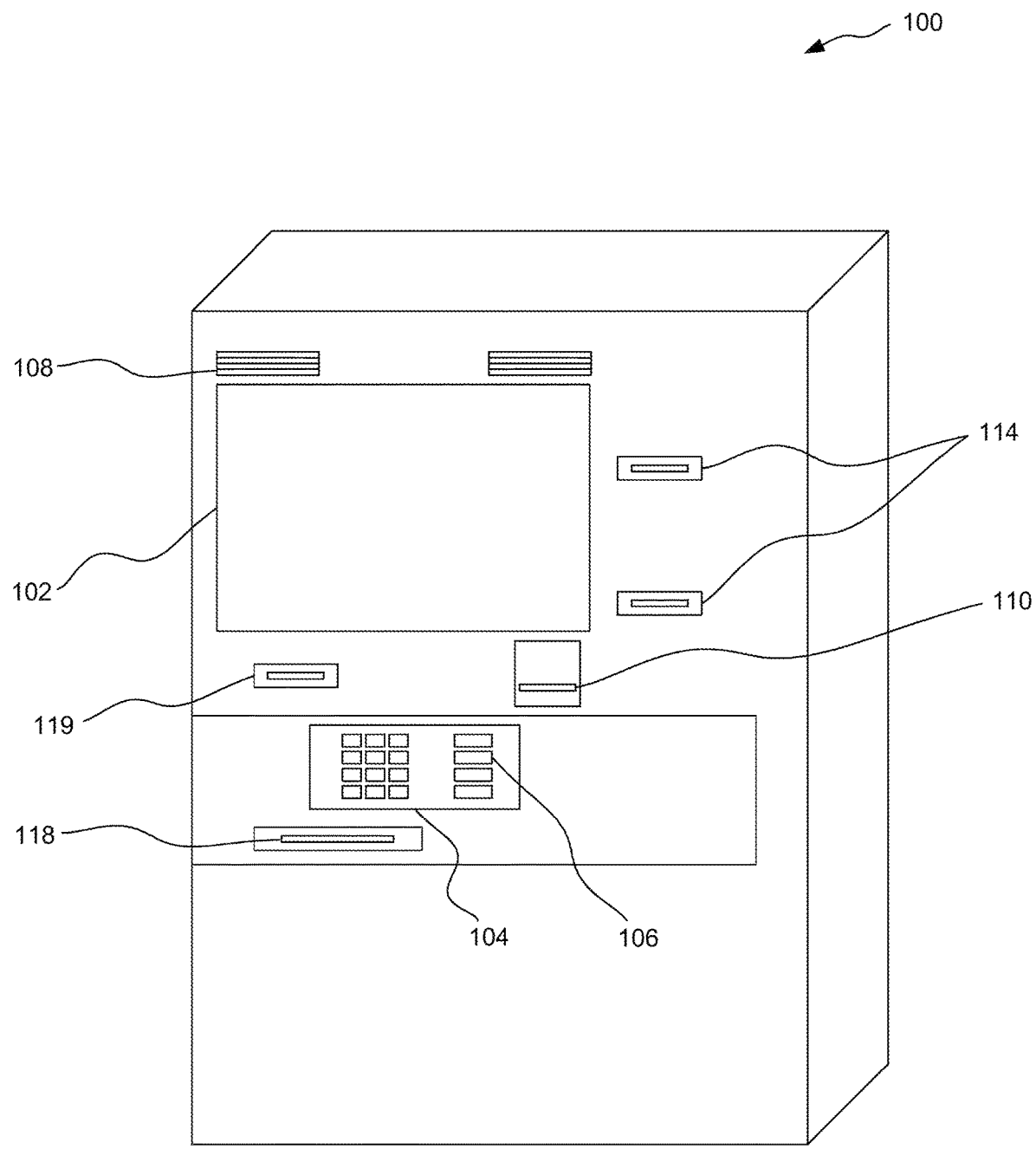
FIG. 1 is a schematic diagram of an automated teller device in accordance with example embodiments of the present disclosure.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except where indicated otherwise either explicitly or inherently by context.

The present disclosure provides an automated teller device having accessibility configurations and a method of operating an automated teller device having accessibility configurations. The automated teller device may be an automated teller machine (ATM) that provides a graphical user interface (GUI) providing a sequence of interfaces to enable a user to perform an action related to the user's account at a service provider such as a financial institution. The ATM may be part of an ATM network. The automated teller device may communicate with a backend server that manages the user account, including stored accessibility options, to automatically apply previously established accessibility options on the automated teller device currently being used. Interactions with an automated teller device can be challenging and prone to errors for certain users, particularly seniors, users with physical and/or mental disabilities, users with language comprehension challenges and users who are uncomfortable with technology. User challenges and preferences may vary widely (e.g., type of need/preference, type of accommodation/accessibility feature desired, level of accommodation/accessibility feature desired, etc.), so the particular accessibility options suited for a particular user may similarly vary widely. The automated teller device and method of the present disclosure provide accessibility features that accommodate a wide range of user challenges and preferences, provide accessibility options for the accessibility features that allow a high level of customization to accommodate user challenges and preferences, provide the ability to apply customized accessibility features to any automated teller device connected to the ATM network, and provide accessibility features which are relatively easy to setup and use.

Moreover, the accessibility features of the present disclosure may be used with a shared GUI that allows a common set of transaction workflow to be used regardless of whether accessibility features are enabled, or the particular accessibility options that are enabled. The present disclosure is believed to provide an improved user experience that is more intuitive than conventional user interfaces of automated teller devices, and that may allow users to interact with the automated teller device in an easier fashion, particular those with physical or cognitive disabilities. In example studies comparing the user interface of the present disclosed, it was found that users' perception of ease of use, enjoyment, speed and customization were higher compared to the conventional user interfaces of automated teller devices.

In accordance with one aspect of the present disclosure, there is provided a method of operating an automated teller device, the automated teller device comprising a processor, a speaker coupled to the processor, a display providing a graphical user interface coupled to the processor, and a keypad coupled to the processor, wherein the keypad comprises a plurality of keys. The method comprises: in response to a setting to disable an accessibility keypad mode, operating a session in a standard keypad mode in which a first set of actions is mapped to the keys of the keypad; and in response to a setting to enable the accessibility keypad mode, operating the session in the accessibility keypad mode in which a second set of actions is mapped to the keys of the keypad, wherein the second set of actions is different from the first set of actions, wherein the second set of actions comprises one or more of actions for navigation and input selection of the graphical user interface, actions for control of audio being reproduced, actions for control of volume of the audio being reproduced, or actions for control of a rate of reproduction of the audio being reproduced.

In accordance with another aspect of the present disclosure, there is provided an automated teller device, comprising a processor, a speaker coupled to the processor, a display providing a graphical user interface coupled to the processor, and a keypad coupled to the processor, wherein the keypad comprises a plurality of keys. The processor is configured to: in response to a setting to disable an accessibility keypad mode, operate the session in a standard keypad mode in which a first set of actions is mapped to the keys of the keypad; and in response to a setting to enable the accessibility keypad mode, operate the session in the accessibility keypad mode in which a second set of actions is mapped to the keys of the keypad, wherein the second set of actions is different from the first set of actions, wherein the second set of actions comprises one or more of actions for navigation and input selection of the graphical user interface, actions for control of audio being reproduced, actions for control of volume of the audio being reproduced, or actions for control of a rate of reproduction of the audio being reproduced.

In some examples of the above aspects and examples, the actions for navigation and input selection of the graphical user interface comprise scroll up, scroll down, scroll left, scroll right and select.

In some examples of the above aspects and examples, the actions for control of audio being reproduced comprises one or more of repeat audio, skip audio, or pause audio reproduction.

In some examples of the above aspects and examples, the actions for control of volume of the audio being reproduced increase volume of the audio being reproduced and decrease volume of the audio being reproduced.

In some examples of the above aspects and examples, the actions for control of a rate of reproduction of the audio being reproduced comprises one or more of increase speed of audio reproduction or decrease speed of audio reproduction.

In some examples of the above aspects and examples, in accessibility keypad mode, the second set of actions comprises actions for navigation and input selection of the graphical user interface, actions for control of audio being reproduced, actions for control of volume of the audio being reproduced, and actions for control of a rate of reproduction of the audio being reproduced.

In some examples of the above aspects and examples, in accessibility keypad mode, the second set of actions comprise ending the session, returning to a previous page in the session, selecting an option selected with an onscreen indicator, and reproducing audio instructions for the accessibility keypad mode.

In some examples of the above aspects and examples, in accessibility keypad mode, the second set of actions comprises actions for navigation and input selection of the graphical user interface, actions for control of audio being reproduced, actions for control of volume of the audio being reproduced, actions for control of a rate of reproduction of the audio being reproduced, and ending the session, returning to a previous page in the session, selecting an option selected with an onscreen indicator, and reproducing audio instructions for the accessibility keypad mode.

In some examples of the above aspects and examples, the keypad comprises an automated teller device keypad comprising a first array of keys of a first type and a second array of keys of a second type, wherein the keys of the first array are arranged in 4×3 array of rows and columns, wherein the keys of the second array are arranged in 4×1 array of rows and columns, wherein the actions for navigation and input selection of the graphical user interface, actions for control of audio being reproduced, actions for control of volume of the audio being reproduced, actions for control of a rate of reproduction of the audio being reproduced, and ending a session, returning to a previous page in the session are mapped to keys of the first array; wherein the actions of the ending the session, returning to a previous page in the session, selecting an option selected with an onscreen indicator, and reproducing audio instructions for the accessibility keypad mode are mapped to keys of the second array.

In some examples of the above aspects and examples, the actions of the second set of actions of the accessibility keypad mode are dependent on context.

In some examples of the above aspects and examples, the context is a current transaction or current screen of the session.

In some examples of the above aspects and examples, the method comprises and the processor is configured to: extract data from the authentication device in communication with the automated teller device; send a signal including the data extracted from the authentication device to a server via a communication interface of the automated teller device; and in response to receipt of a response signal from the server via the communication interface of the automated teller device, the response signal providing information identifying an account associated with the authentication device and accessibility options for the account including a setting specifying whether the accessibility keypad mode is enabled or disabled, automatically apply the accessibility options on the automated teller device.

In some examples of the above aspects and examples, the accessibility options comprise an audio reproduction option for enabling reproduction of audio associated with screens of the graphical user interface and the accessibility keypad mode option for enabling the accessibility keypad mode.

In some examples of the above aspects and examples, the accessibility options further comprise a display option for the graphical user interface.

In some examples of the above aspects and examples, the display option for the graphical user interface is selected from the group consisting of a blank screen, screens comprising text and a background image, screens comprising white text and a black background, screens comprising black text and a white background, or screens comprising yellow text and a black background.

In some examples of the above aspects and examples, the accessibility options further comprise a brightness option for the graphical user interface and a text size option for the graphical user interface.

In some examples of the above aspects and examples, the display comprises a touchscreen, wherein the graphical user interface displayed on the touchscreen is configured to receive navigation and selection input from both the touchscreen and the keypad.

In some examples of the above aspects and examples, the graphical user interface comprises a plurality of interconnected screens, wherein each of the interconnected screens comprises an accessibility button for invoking an accessibility options interface for configuring the accessibility options.

In some examples of the above aspects and examples, the accessibility option is provided by an onscreen button located in a horizontal toolbar located at a bottom of each of the interconnected screens of the graphical user interface.

In some examples of the above aspects and examples, the method comprises and the processor is configured to: in the standard keypad mode, perform an action in the first set of actions in response to input received by a respective key of the keypad; and in the accessibility keypad mode, perform an action in the second set of actions in response to input received by a respective key of the keypad.

In accordance with a further aspect of the present disclosure, there is provided a method of operating an automated teller device, the automated teller device comprising a processor, a speaker coupled to the processor, a display providing a graphical user interface coupled to the processor, and a keypad coupled to the processor, wherein the keypad comprises a plurality of keys. The method comprises: extracting data from an authentication device in communication with the automated teller device; sending a signal including the data extracted from the authentication device to a server via the communication interface; and in response to receipt of a response signal from the server via the communication interface of the automated teller device, the response signal providing information identifying an account associated with the authentication device and accessibility options for the account, automatically applying the accessibility options on the automated teller device, wherein the accessibility options comprise one or more of an audio reproduction option for enabling reproduction of audio associated with screens of the graphical user interface, an accessibility keypad mode option for enabling the accessibility keypad mode, a display option for the graphical user interface, a brightness option for the graphical user interface or a text size option for the graphical user interface.

In accordance with yet a further aspect of the present disclosure, there is provided an automated teller device, the automated teller device comprising a processor, a speaker coupled to the processor, a display providing a graphical user interface coupled to the processor, and a keypad coupled to the processor, wherein the keypad comprises a plurality of keys. The processor is configured to: extract data from an authentication device in communication with the automated teller device; send a signal including the data extracted from the authentication device to a server via the communication interface; and in response to receipt of a response signal from the server via the communication interface of the automated teller device, the response signal providing information identifying an account associated with the authentication device and accessibility options for the account, automatically apply the accessibility options on the automated teller device, wherein the accessibility options comprise one or more of an audio reproduction option for enabling reproduction of audio associated with screens of the graphical user interface, an accessibility keypad mode option for enabling the accessibility keypad mode, a display option for the graphical user interface, a brightness option for the graphical user interface or a text size option for the graphical user interface.

In accordance with further aspects of the present disclosure, there is provided an apparatus comprising at least one processor, wherein the executable instructions, when executed by the at least one processor, cause the processor to perform at least parts of the methods described herein.

In accordance with yet further aspects of the present disclosure, there is provided a non-transitory machine readable medium having tangibly stored thereon executable instructions for execution by at least one processor, wherein the executable instructions, when executed by the at least one processor, cause the processor to perform at least parts of the methods described herein.

Figure 2:
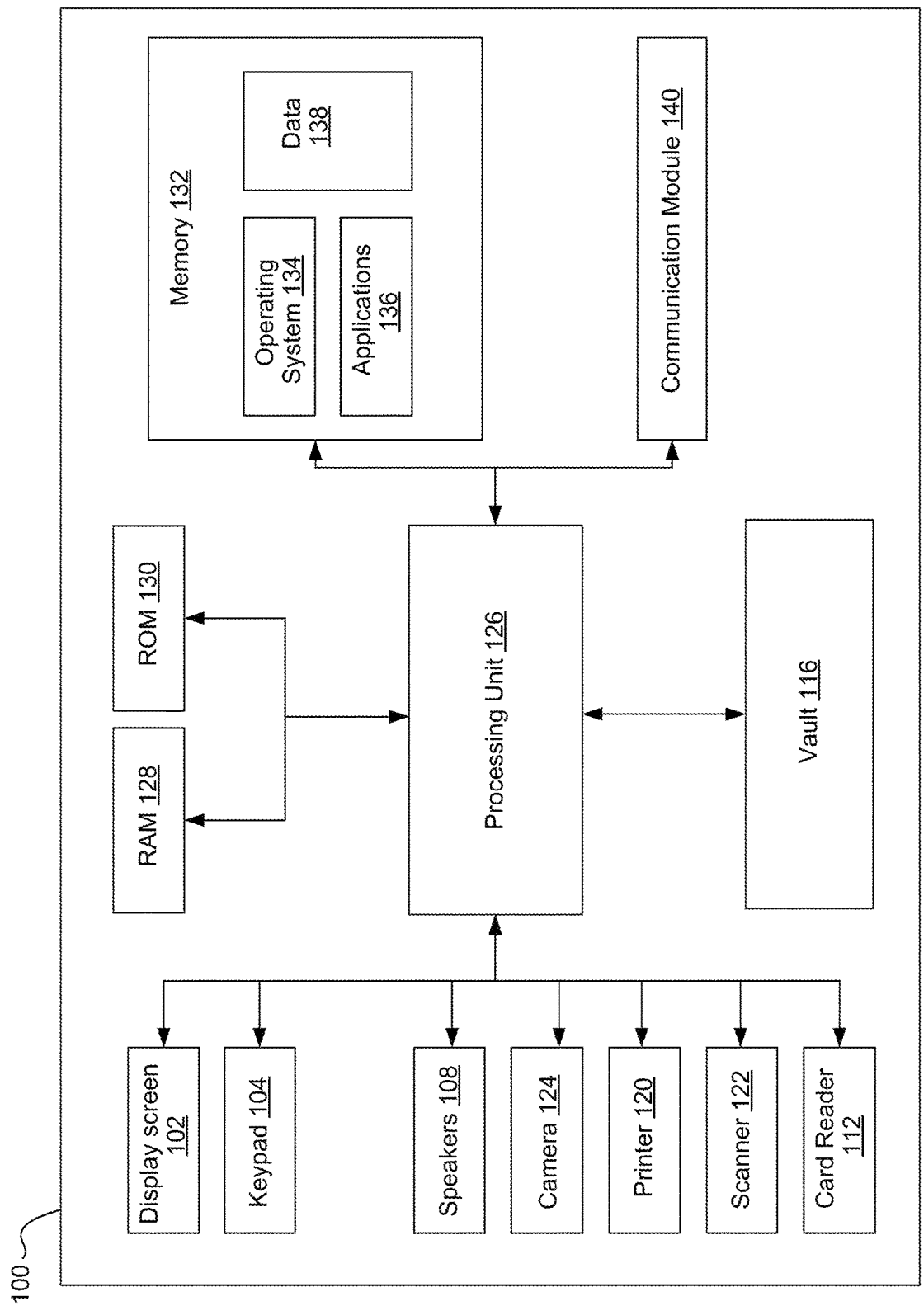
FIG. 2 is a block diagram showing some internal components of the automated teller device of FIG. 1.

FIGS. 1 and 2 show an example automated teller device 100 that may be used to implement example embodiments of the present disclosure. The automated teller device 100 includes one or more input and/or output (I/O) devices that facilitate interaction between the user and the automated teller device. As shown, a display 102 is provided which may be a touchscreen or non-touchscreen display depending on the embodiment. Where the display 102 is a touchscreen display, the display 102 may serve as both an input device as well as an output device. A graphical user interface is displayed on the display 102 to enable any suitable textual and/or graphical output/input. The GUI comprises a plurality of interconnected screens each of which comprises an accessibility button for invoking an accessibility options interface for configuring (e.g., setting or changing) accessibility options.

The example automated teller device 100 includes a keypad 104 comprising a plurality of keys which may be used to provide input to the automated teller device 100. The keypad 104 may be used, for example, to enter numerical/non-numerical inputs which may be used to input an authentication code (e.g., personal identification number (PIN)), input numerical values, confirm/cancel a particular action, and/or navigate through the GUI provided by the automated teller device 100. The keypad 104 may include alphanumeric keys, multi-function and/or keys for specific input, (e.g., "Accept", "Cancel"). The keypad 104 may be equipped with braille (or other forms of tactile indicators) to improve accessibility for visually impaired users.

The automated teller device 100 may include audio input/output devices, such as a microphone (not shown) for receiving audio user input and, as shown, one or more speakers 108 for providing audio output. Other examples of I/O devices may include, for example, a mouse, an optical reader, and/or a stylus (or other input device(s)) through which a user of the automated teller device 100 may provide input.

An access card may be received, through a card slot 110, into the automated teller device 100 to be read by a card reader 112. In some examples, the card reader 112 reads a magnetic strip on the back of the access card to extract information stored thereon. In other examples, such information may be stored in an integrated circuit (IC) chip embedded within the access card in addition to, or instead of, the magnetic strip, which may be read by the card reader 112. In other examples, an authentication device may be in communication with the automated teller device 100 and may send a signal including data. For example, the card slot 110 may be a near field communication (NFC) terminal or NFC enabled, wherein a user can send information via the authentication device (for example via a NFC enabled mobile device) to the NFC capable card slot 110. The data received by the card reader 112, or card slot 110 (whether through a card or authentication device) may be used to perform functions such as authentication (for example card authentication, card holder validation, user account validation) and/or account information retrieval.

User interactions with the automated teller device 100 may include insertion of physical input (e.g., cash and/or check, or other physical representations of data) through one or more input slots 114. The automated teller device 100 may incorporate sensors (e.g., an optical scanner 122) and/or a digital image processor to process the received physical input. Physical output, such as cash, may be extracted from the vault 116 inside the automated teller device 100 and dispensed to the user through an output slot 118. Another output slot 119 may be used to provide a physical record, such as a paper receipt, of the user's interactions with the automated teller device 100 during a session. A session on the automated teller device 100 may be defined to include the inputs, outputs provided on the automated teller device 100 from the start of user interaction with the automated teller device 100 (e.g., starting with insertion of an access card into the card slot 110) and ending when the user chooses to end interactions with the automated teller device 100 (e.g., user provides input to the automated teller device 100 indicating that all desired actions have completed and/or user logs out). The physical record may be generated by a printer 120 inside the automated teller device 100. Additionally or alternatively, a record of the session may be emailed to the user. The automated teller device 100 may include a camera 124, which may be used to record video (e.g., for security purposes) and/or to facilitate interaction between the user and a local or remote agent.

Internally, the automated teller device 100 includes a processing unit 126, which may comprise one or more processors, for controlling overall operation of the automated teller device 100. The processing unit 126 may be operably coupled to one or more of random access memory (RAM) 128, read-only memory (ROM) 130, memory 132, and input/output (I/O) devices such as those described above. Machine-executable instructions may be stored within memory 132 and/or other storage to provide instructions to the processing unit 126 for enabling the automated teller device 100 to perform various functions. For example, the memory 132 may store instructions for implementing an operating system 134, and one or more application programs 136. The memory 132 may also store data 138 locally. Additionally or alternatively, some or all of the machine-executable instructions for the automated teller device 100 may be embodied in hardware or firmware (not shown). In this example, the automated teller device 100 further includes a communication interface 140, for wired and/or wireless communication with other network devices (see FIG. 3, for example).

In examples in which the authentication device sends data to the automated teller device 100, the processing unit 126 may be configured to initiate a session in response to authentication of an authentication device. For example, in response to determination that an access card is authenticated, the processing unit 126 may initiate a session which includes displaying an appropriate screen of the GUI on display 102 and playing sounds through speaker 108.

Figure 3:
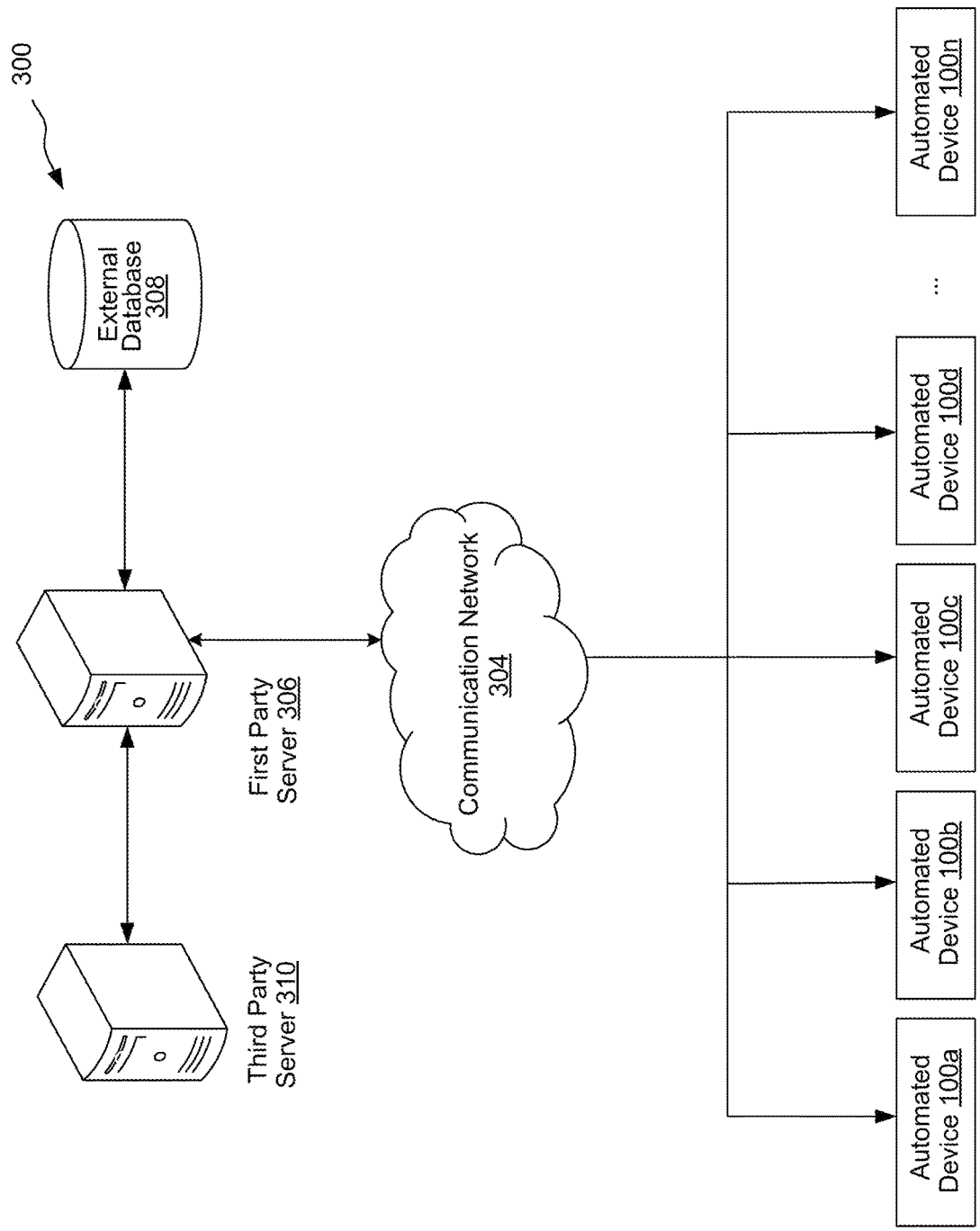
FIG. 3 is a schematic diagram of a network environment in which example embodiments of the present disclosure may be implemented.

FIG. 3 shows an example network 300 in which the example automated teller device 100 may be implemented. In this example, a plurality of automated teller devices 100a-100n may be connected through a communication network 304, to a first-party server 306 via any suitable communications links, such as network links, wireless links, hard-wired links, and the like. The communication interface of the automated teller devices 100a-100n may be an instance of the automated teller device 100 of FIG. 1, or other suitable automated teller device. The automated teller devices 100a-100n may be the same or different from each other.

The automated teller device 100 may include one or more communication interfaces for wired or wireless communication with communication network 304. The communication interfaces may include wired links (e.g., Ethernet cable) and/or wireless links (e.g., one or more radio frequency links) for intra-network and/or inter-network communications. The communication interfaces may provide wireless communication via one or more transmitters or transmitting antennas, one or more receivers or receiving antennas, and various signal processing hardware and software, for example. The communication interfaces may be configured for sending and receiving data to the first-party server 306 or to other user devices, access points, reception points, transmission points, network nodes, gateways or relays (not shown) in the communication network 304.

The communication network 304 may include any one or more suitable computer networks including, for example, the Internet, an intranet, a wide-area network (WAN), a wireless WAN (WWAN), a local-area network (LAN), a wireless LAN (WLAN), a wireless network, a digital subscriber line (DSL) network, a frame relay network, an asynchronous transfer mode network, a virtual private network (VPN), a public-switched telephone network (PSTN), or a public-land mobile network (PLMN), or any combination of any of the same. Network communications may be facilitated through the use of any suitable communication such as TCP/IP, Ethernet, FTP, HTTP, HTTPS, and the like. The communication network 304 may be, or comprise, the interbank network (also referred to as the ATM consortium or ATM network).

The first-party server 306 may be a backend server associated with the same service provider as the automated teller devices 100a-100n. The first-party server 306 may be operable to communicate signals and exchange data with each of the plurality of automated teller devices 100a-100n. The first-party server 306 in this example network 300 is also coupled to an external database 308 that may store data (e.g., user account information) accessible by the first-party server 306. The data stored by the database 308 comprises user account information and provisioning data for data transfers in corresponding records. The database 308 is located externally to and remote from the automated devices 100. The first-party server 306 in this example network 300 is also coupled to a third-party server 310, which may provide third party services, such as authentication services, or may be associated with another service provider (e.g., another financial institution). The first-party server 306 may be coupled to the external database 308 and/or the third-party server 310 via one or more networks (not shown). It is to be appreciated that although one instance each of the first-party server 306, external database 308, third-party server 310 and communication network 304 are shown, any of the components in FIG. 3 may be present in any number.

The first-party server 306 comprises a controller comprising at least one processor which controls the overall operation of the first-party server 306. The processor is coupled to a plurality of components via a communication bus which provides a communication path between the components and the processor. The processor is coupled to a communication module that communicates with corresponding communication modules of automated devices 100 and third-party server 310 by sending and receiving corresponding signals. The first-party server 306 may comprise, or communicate with, a data transfer server which generates data transfer instructions via an instruction generation module, sends and/or receives data transfer instructions between various endpoints (e.g., automated devices 100, first-party server 306, third-party server 310, etc.) and which processes data transfer instructions via an instruction processing module.

The implementation of the methods described herein include a sequence of interfaces, also referred to as user interfaces or graphical user interfaces (GUIs), to be provided by the automated device, as discussed below. One or more interfaces in the interface sequence may provide one or more selectable options as discussed below, each selectable option being selectable, for example by interacting with a touchscreen and/or a keypad 104 of the automated teller device 100. The selection options are provided in onscreen buttons or other user interface elements. The selectable options, when selected via corresponding interaction, cause different interfaces to be displayed which may, in some instances, involve communications between the automated teller device 100 and the first-party server 306 to obtain information to dynamically populate interfaces in the interface sequence. The methods described herein may be implemented during a session with the automated teller device 100, for example as a portion of the session. The methods described herein may be implemented together to provide a sequence of interfaces.

Automatic Application of Pre-Established Accessibility Options

Figure 4:
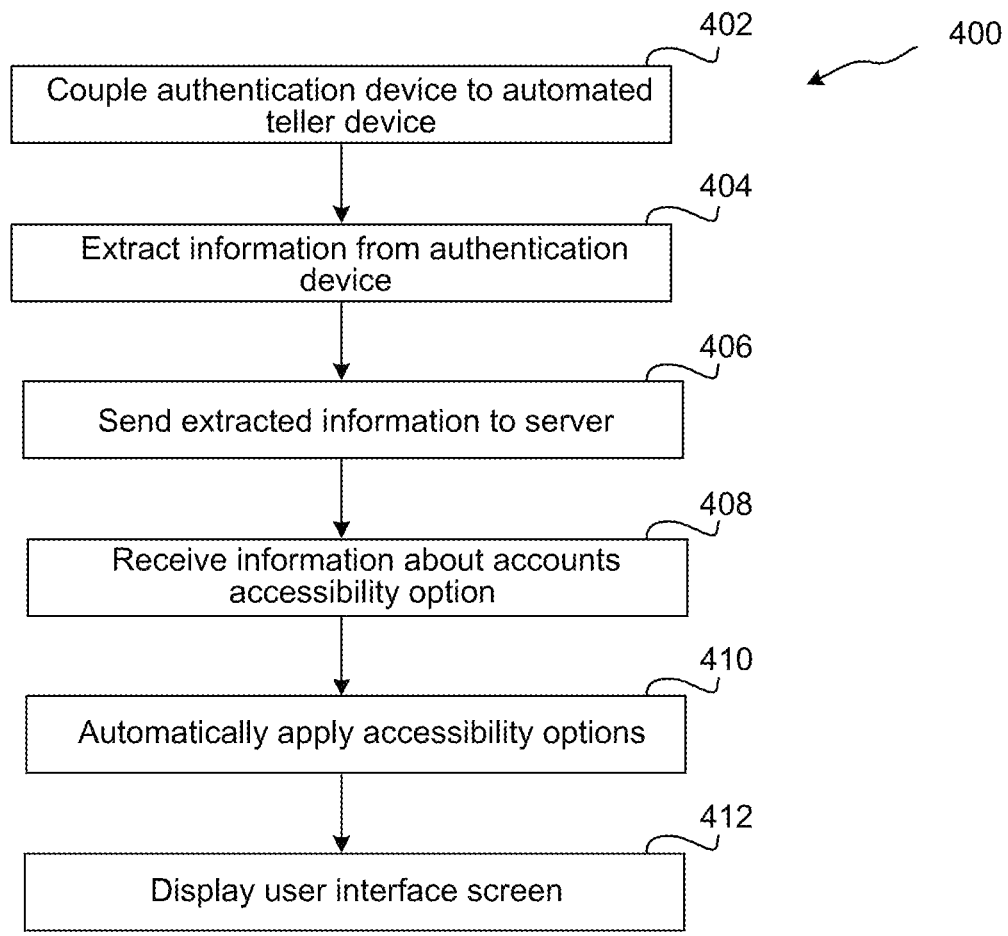
FIG. 4 is a flowchart of a method of operating an automated teller device in accordance with an example embodiment of the present disclosure.

FIG. 4 is a flowchart of an example method 400 for operating an automated teller device 100 in accordance with an example embodiment of the present disclosure. The method 400 may be performed by the automated teller device 100, for example, by the processing unit 126. The method 400 may be implemented during a session with the automated teller device, for example, as a user interface sequence. The method 400 may be implemented together with other methods discussed herein to provide a sequence of interfaces to set and/or apply accessibility settings.

The session may be initiated in response to communication of the automated teller device 100 with an authentication device, either before or after authentication of the authentication device. For example, the session may be initiated in response to authentication of an authentication device. The implementation of the method 400 may include a sequence of GUI screens be provided by the automated teller device 100, as discussed below. The GUI screens provide one or more selectable options, each selectable option being selectable by interacting with a touchscreen (e.g., display 102) and/or a keypad 104 of the automated teller device 100. The method 400 may include communication between the automated teller device 100, first-party server 306 and possibly third-party server 310, and use data received from the first-party server 306 or possibly third-party server 310 to dynamically configured the interface of the automated teller device and the functionality of one or more of the keypad 104, display 102, and speakers 108.

At operation 402, an authentication device is communicatively coupled to the automated teller device 100. The authentication device may be an access card received by the automated teller device 100 via the card slot 118 or a smart tag, smartcard, smartphone or other device that communicates with the automated teller device 100 via NFC or other suitable communication protocol.

At operation 404, the authentication device is processed by the automated teller device 100 to extract information stored by the authentication device. The information extracted from the authentication device may include information used to identify whether the authentication device is associated with an account that is managed by the first-party service provider (e.g., financial institution) that owns or operates the automated teller device 100 or a third-party service provider.

At operation 406, the automated teller device 100 sends the information extracted from the authentication device to a backend server, for example, the first-party server 306 owned or operated by the first-party service provider that owns or operates the automated teller device 100, to identify and/or retrieve information about one or more accounts associated with a user to whom the authentication device is assigned. When the first-party server 306 determines that the authentication device is associated with an account that is managed by a third-party service provider, the first-party server 306 may further communicate with a service provider network to obtain account information from the third-party service provider.

The first-party server 306 sends to the automated teller device 100 a signal providing information about the account(s) associated with the authentication device identifying the account(s) associated with the authentication device. The information provided by the first-party server 306 may include information indicating whether the authentication device is associated with an account that is managed by another service provider, for example. The information provided by the first-party server 306 includes any accessibility options for the user account that are stored by the first-party server 306 or possible provided by a third-party server 310 in response to a determination that the account is managed by third-party service provider. In this way, accessibility options for the account may be obtained at any automated teller device 100 connected to the communication network 304. This obviates the need to re-enter accessibility options each time an automated teller device 100 is used.

The accessibility options may comprise a setting specifying whether the accessibility options are enabled or disabled and/or what accessibility options are enabled or disabled. The accessibility options may comprise a setting specifying whether the accessibility keypad mode is enabled or disabled in some examples. The accessibility options may be linked, combined and/or dependent on each other in some examples. For example, when audio support is enabled, an option for a blank screen may be provided as a screen option.

The accessibility options may comprise one or more of an audio reproduction option for enabling reproduction of audio associated with the screens of the graphical user interface, an accessibility keypad mode option for enabling the accessibility keypad mode, a display option for the graphical user interface, a brightness option for the graphical user interface or a text size option for the graphical user interface in some examples.

In some examples, the accessibility options comprise an audio reproduction option for enabling reproduction of audio associated with the screens of the graphical user interface and the accessibility keypad mode option for enabling the accessibility keypad mode.

In some examples, the accessibility options further comprise a display option for the graphical user interface. In some examples, the display option for the graphical user interface is selected from the group consisting of a blank screen, screens comprising text and a background image, screens comprising white text and a black background, screens comprising black text and a white background, or screens comprising yellow text and a black background. In some examples, the accessibility options further comprise a brightness option for the graphical user interface and a text size option for the graphical user interface.

In some examples in which the display comprises a touchscreen and the GUI of the automated teller device 100 is displayed on the touchscreen, the GUI is configured to receive navigation and selection input from both the touchscreen and the keypad 104.

Figure 6:
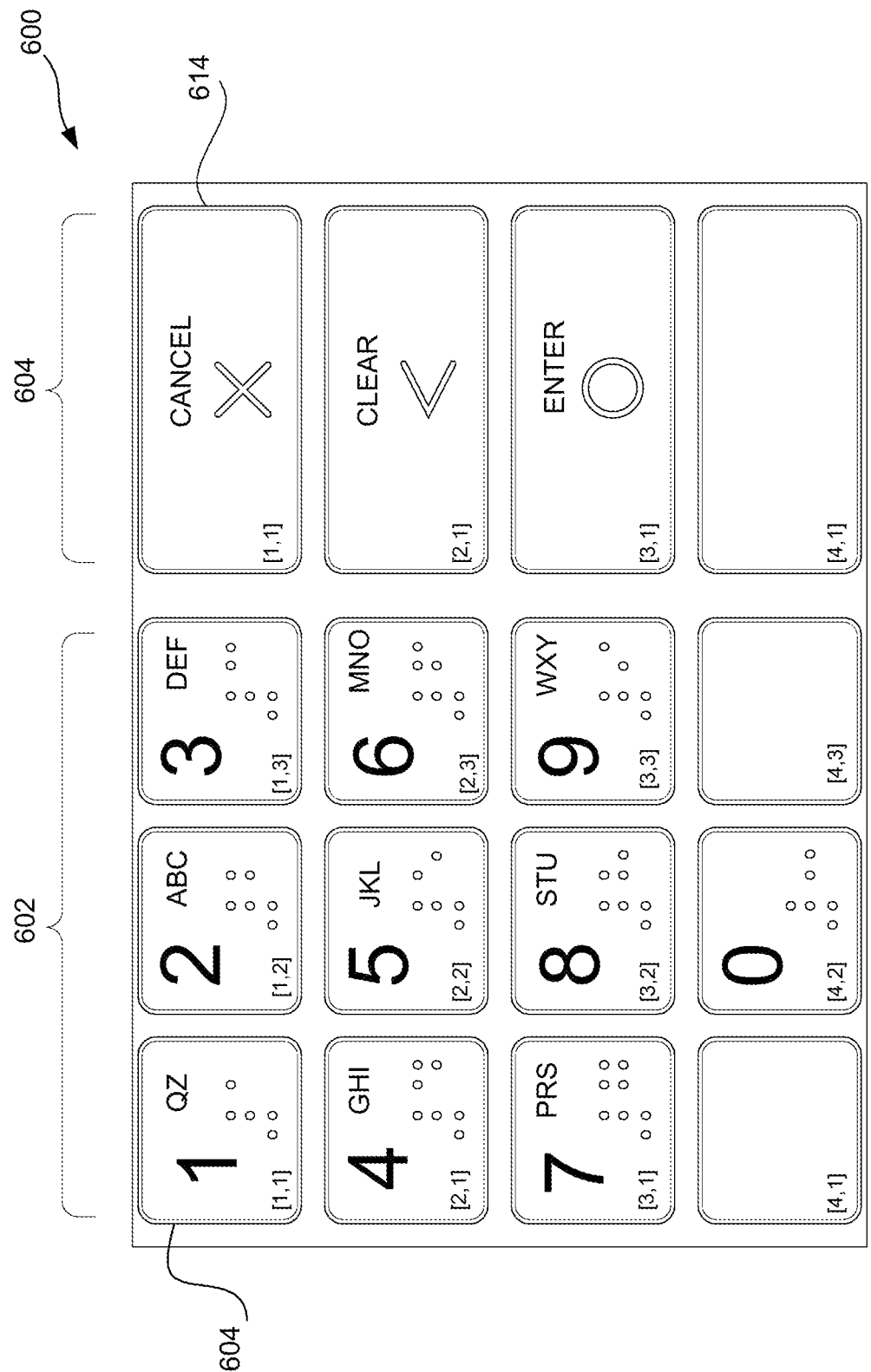
FIG. 6 is an example of a keypad for an automated teller device in accordance with example embodiments of the present disclosure.

FIG. 6 illustrates an example of a standard ATM keypad 600 that may be used for the keypad 104. The keypad 600 comprises a first array 602 of keys 604 of a first type and a second array 612 of keys 614 of a second type (only one of the keys 604 and 614 are labeled in FIG. 6 for ease of explanation). The keys 614 are generally rectangular whereas the keys 614 are generally square in the shown example, with both types of keys being the same height and differing only in width in the shown example. The arrays 602 and 612 are generally rectilinear in the shown example. The keys 604 of the first array 602 are arranged in 4×3 array of rows and columns. The keys 614 of the second array 612 are arranged in 4×1 array of rows and columns. The position of each key in the first array 602 is denoted by a position [i, j], wherein i is the row number from top to bottom of the keypad 600, and j is the column number from the left to right of the first array 602 of the keypad 600. Similarly, the position of each key in the second array 612 is denoted by a position [i, j], wherein i is the row number from top to bottom of the second array 612 of the keypad 600, and j is the column number from the left to right of the keypad 600. Alternative functions or actions are mapped to keys in the first array 602 and/or second array 612 in the accessible keypad mode.

At least some, possibly all, of the keys 604, 614 may be embossed with braille or other raised indicator that may allow some users to identify the keys by feel. In the shown examples, the keys 604 of the first array 602 are numeric keys for inputting a number in a standard keypad mode in which a first set of actions is mapped to the keys of the keypad 104. The keys 614 of the second array 612 are action keys used to perform particular actions in standard keypad mode. The automated teller device 100 performs an action in the first set of actions in response to input received by a respective key of the keypad 108 in the standard keypad mode.

Figure 13:
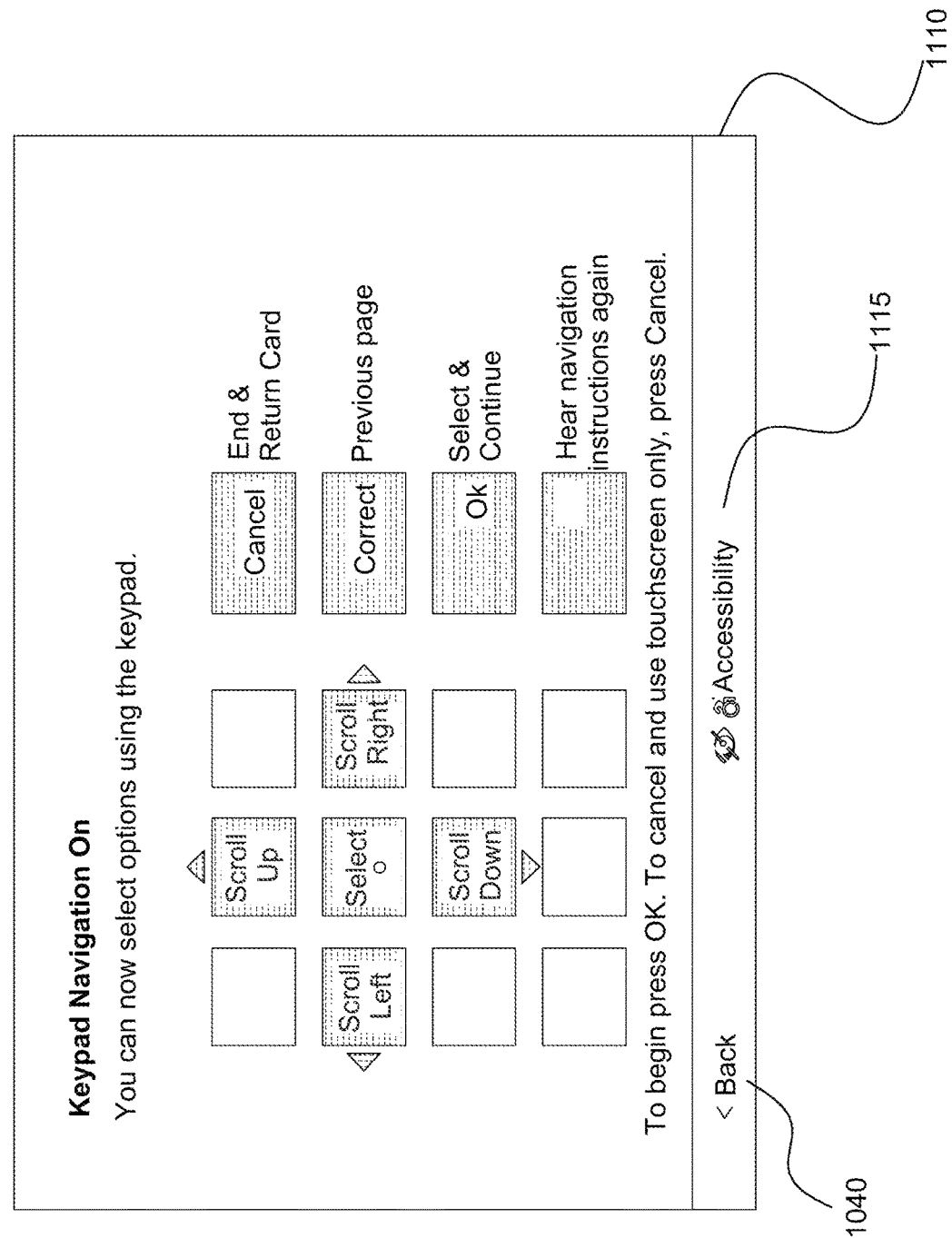
FIG. 13 is a keypad navigation interface in accordance with an example embodiment of the present disclosure.
Figure 15:
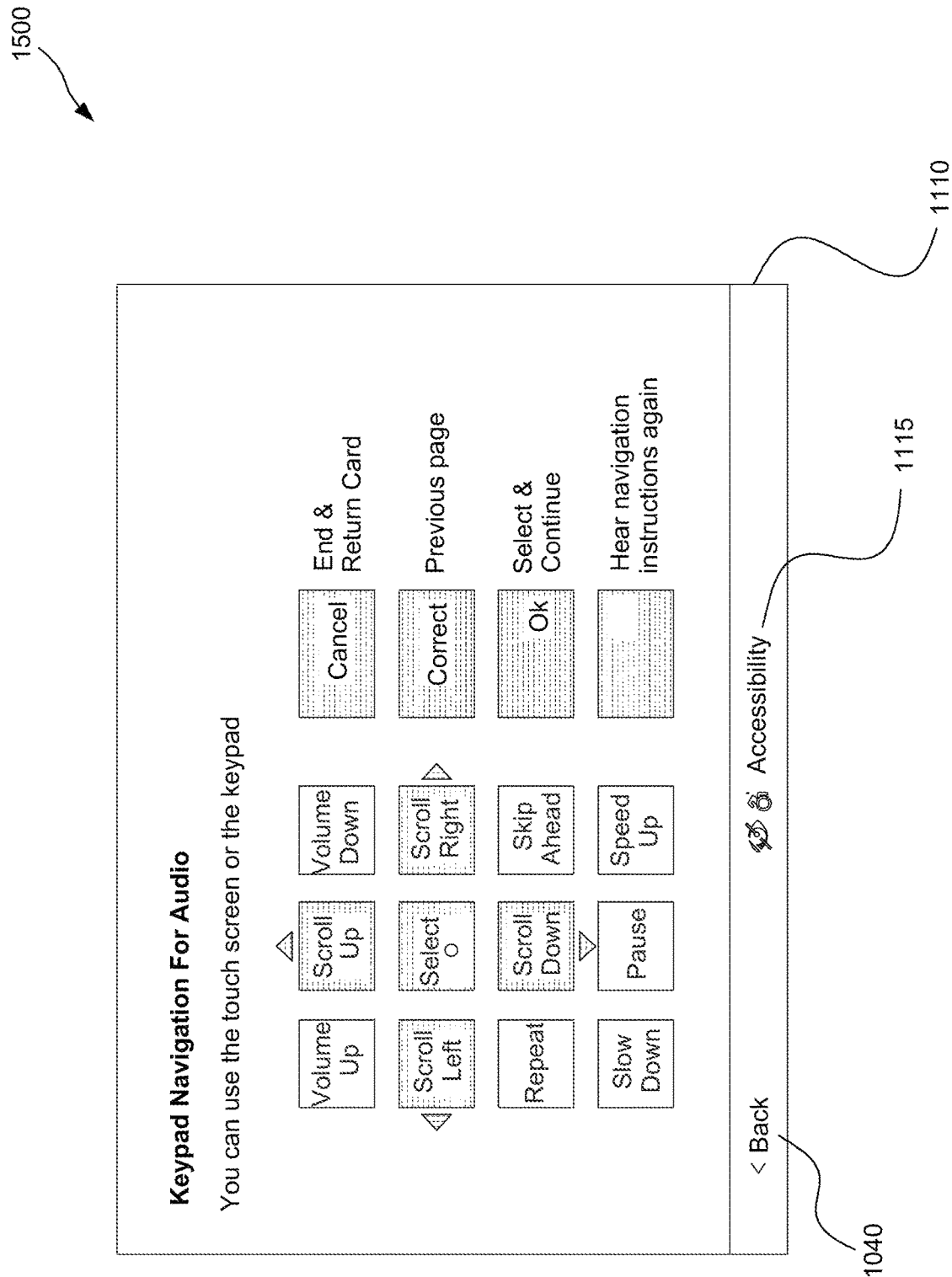
FIG. 15 is an example keypad navigation for audio interface in accordance with an example embodiment of the present disclosure.

FIGS. 13 and 15 illustrate two example alternative key mappings that may be used in an accessibility keypad mode in which a second set of actions is mapped to the keys of the keypad 104, the second set of actions being different from the first set of actions in the standard keypad mode. The actions of the second set of actions of the accessibility keypad mode may be dependent on context in some examples. The context may be, for example, a current transaction or current screen of the session. The automated teller device 100 performs an action in the second set of actions in response to input received by a respective key of the keypad in the accessibility keypad mode.

In FIG. 13, a first alternative key mapping for the accessibility keypad mode is show in which the keys 604 of the first array 602 are used for onscreen navigation. When onscreen navigation is enabled, an onscreen visual indicator is used to indicate the currently selected onscreen button or element. The onscreen visual indicator may be visually represented as a hand, finger, arrow, pointer, cursor, caret or other suitable visual indicator. Alternatively, the onscreen visual indicator may be provided by highlighting or changing the color of the currently selected onscreen button or element. Navigating with the keys 604 of the first array 602, by depressing a respective key 604, selects another onscreen button in the currently displayed GUI screen in accordance with the navigation direction associated with the selected key 604, if anther onscreen button is available. When the display 102 is a touchscreen, another onscreen button in the currently displayed GUI screen can also be selected by touching a designated touch area of the currently displayed GUI screen for the onscreen button.

The second set of actions may comprise one or more of actions for navigation action (or input) or selection action (or input) of the graphical user interface. The actions for navigation action and selection action of the GUI may comprise scroll up, scroll down, scroll left, scroll right and select. In the example of FIG. 13, the "up"/"scroll up" action is mapped to the key 604 in the [1,2] position of the first array 602 (the "2" key), the "left"/"scroll left" action is mapped to the key 604 in the [2,1] position of the first array 602 (the "4" key), the "right"/"scroll right" action is mapped to the key 604 in the [2,3] position of the first array 602 (the "6" key), and the "down"/"scroll down" action is mapped to the key 604 in the [3,2] position of the first array 602 (the "8" key). In the example of FIG. 13, the action for selecting an option selected with an onscreen indicator is mapped to the key 604 in the [2, 2] position of the first array 602 (the "5" key).

The second set of actions may also comprise one or more of ending the session, returning to a previous page in the session, selecting an option selected with an onscreen indicator, or reproducing audio instructions for the accessibility keypad mode. In the example of FIG. 13, the actions of the ending the session, returning to a previous page in the session, selecting an option selected with an onscreen indicator, and reproducing audio instructions for the accessibility keypad mode are mapped to keys of the second array are mapped to keys 614 of the second array 612. In the example of FIG. 13, the action of ending the session is mapped to the key 614 in the [1,1] position of the second array 612, the action of returning to a previous page in the session is mapped to the key 614 in the [2,1] position of the second array 612, the action for selecting an option selected with an onscreen indicator is mapped to the key 612 in the [3,1] position of the second array 612, and the action for reproducing audio instructions for the accessibility keypad mode is mapped to the key 612 in the [4,1] position of the second array 612.

In FIG. 15, a second alternative key mapping for the accessibility keypad mode is show in which the keys 604 of the first array 602 are used for onscreen navigation and audio support. When audio support is enabled, audio is supplied via a headset jack of the automated teller device 100 to a headset of a user insert into the headset inserted into the headset jack of the automated teller device 100 via a headset plug. The audio support comprises audio reproduction that may describe the currently displayed GUI screen, confirm selections/inputs received by the automated teller device 100, and confirm the currently selected onscreen button/item. The GUI screens may also be adapted to include text and/or graphics to confirm previous selections/inputs received by the automated teller device 100 and the current, requested or required information, the current workflow/transaction and/or other relevant, context-sensitive information, thereby complementing the audio support. The second set of actions may comprise one or more of actions for control of audio being reproduced, actions for control of volume of the audio being reproduced, or actions for control of a rate of reproduction of the audio being reproduced. For example, audio may be repeated, skipped or paused. The volume of the audio may be increased or decreased, and the speed of the audio may be increased or decreased. The user may also be given screen options associated with audio support, such as a "blank screen" so that no meaningful content is displayed on the display 102 for the remaining of the session, only a logo, picture, text, or blank but no account or transaction information.

The actions for control of audio being reproduced may comprise one or more of repeat audio, skip audio, or pause audio reproduction. The actions of repeat audio, skip audio, and pause audio reproduction may be mapped to keys 604 of the first array 602. In the example of FIG. 15, the action of repeat audio is mapped to the key 604 in the [3,1] position of the first array 602 (the "7" key), action of skip audio is mapped to the key 604 in the [3,3] position of the first array 602 (the "9" key), and the action of pause audio reproduction is mapped to the key 604 in the [4,2] position of the first array 602.

The actions for control of volume of the audio being reproduced may comprise one or more of increase volume of the audio being reproduced or decrease volume of the audio being reproduced. The actions of increase volume of the audio being reproduced or decrease volume of the audio being reproduced may be mapped to keys 604 of the first array 602. In the example of FIG. 15, the action of increase volume of the audio being reproduced is mapped to the key 604 in the [1,1] position of the first array 602 (the "1" key) and the action of decrease volume of the audio being reproduced is mapped to the key 604 in the [1,3] position of the first array 602 (the "3" key).

The actions for control of a rate of reproduction of the audio being reproduced may comprise one or more of increase speed of audio reproduction or decrease speed of audio reproduction. The actions of increase speed of audio reproduction and decrease speed of audio reproduction may be mapped to keys of the first array 602. In the example of FIG. 15, the action of increase speed of audio reproduction is mapped to the key 604 in the [4,3] position of the first array 602 and the action of decrease speed of audio reproduction is mapped to the key 604 in the [4,1] position of the first array 602.

At operation 408, the information from the first-party server 306 including any accessibility options for the account(s) is received by the automated teller device 100. At operation 410, the automated teller device 100 automatically applies accessibility features on the automated teller device 100 based on the retrieved accessibility options, if any. The display settings for the display 102, audio settings for the speakers 108 and keypad settings of the keypad 104 are configured in accordance with the retrieved accessibility options, if any.

At operation 412, a user interface screen is displayed on display 102 in accordance with the accessibility options for the account. In some examples, the user interface may be a welcome interface, such as the welcome interface 700 shown in FIG. 7 or an authentication interface (also be referred to as the authentication code entry screen or PIN entry screen), such as the authentication interface 800 of FIG. 8, if the authentication has not already been performed.

The welcome interface 700 includes a plurality of selectable options 702a-702d (generally referred to as options 702), which may be selected to initiate an action using the automated teller device 100. The options 702 displayed at the welcome interface 700 may be a subset of all available actions that may be performed using the automated teller device 100. In some examples, the options 702 displayed at the welcome interface 700 may depend on the capabilities of the automated teller device 100 and/or the actions that are permissible for the account(s), which are determined based on the inserted access card as described above. For example, if the account is not managed by the first-party service provider, the options 702 may be more limited than if the account is managed by the first-party service provider that owns the automated teller device 100. The provided options 702 may depend on the capabilities of the automated teller device 100, for example whether the automated teller device 100 is able to provide certain types of output (e.g., cash or foreign currency). The options 702 may also be dynamically modified based on the current state of the automated teller device 100. For example, the automated device may normally be capable of providing a certain type of output (e.g., cash) but may be in a current state in which that capability is not available (e.g., the automated teller device 100 has run out of cash).

Figure 7:
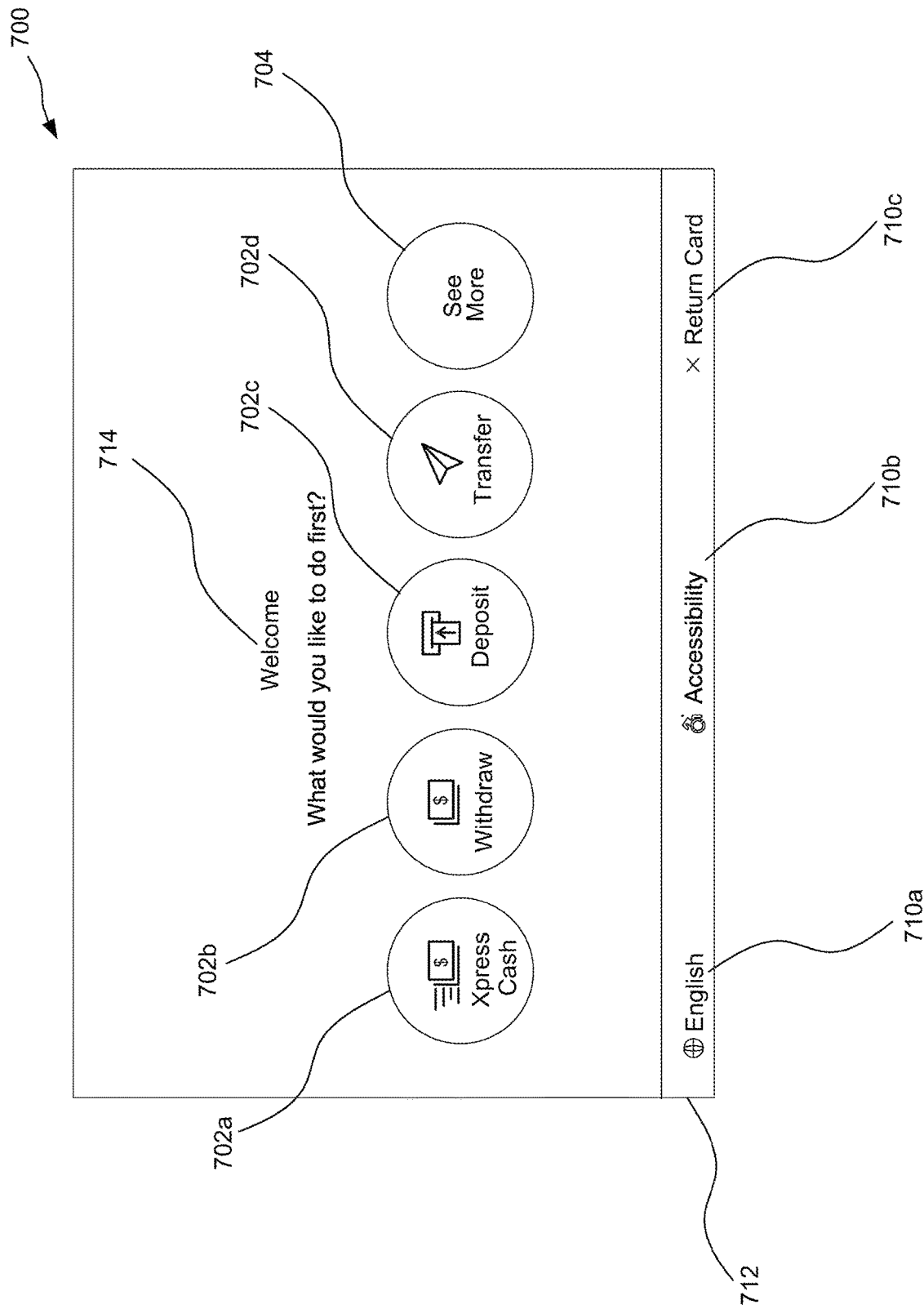
FIG. 7 is an example welcome interface in accordance with example embodiments of the present disclosure.
Figure 8:
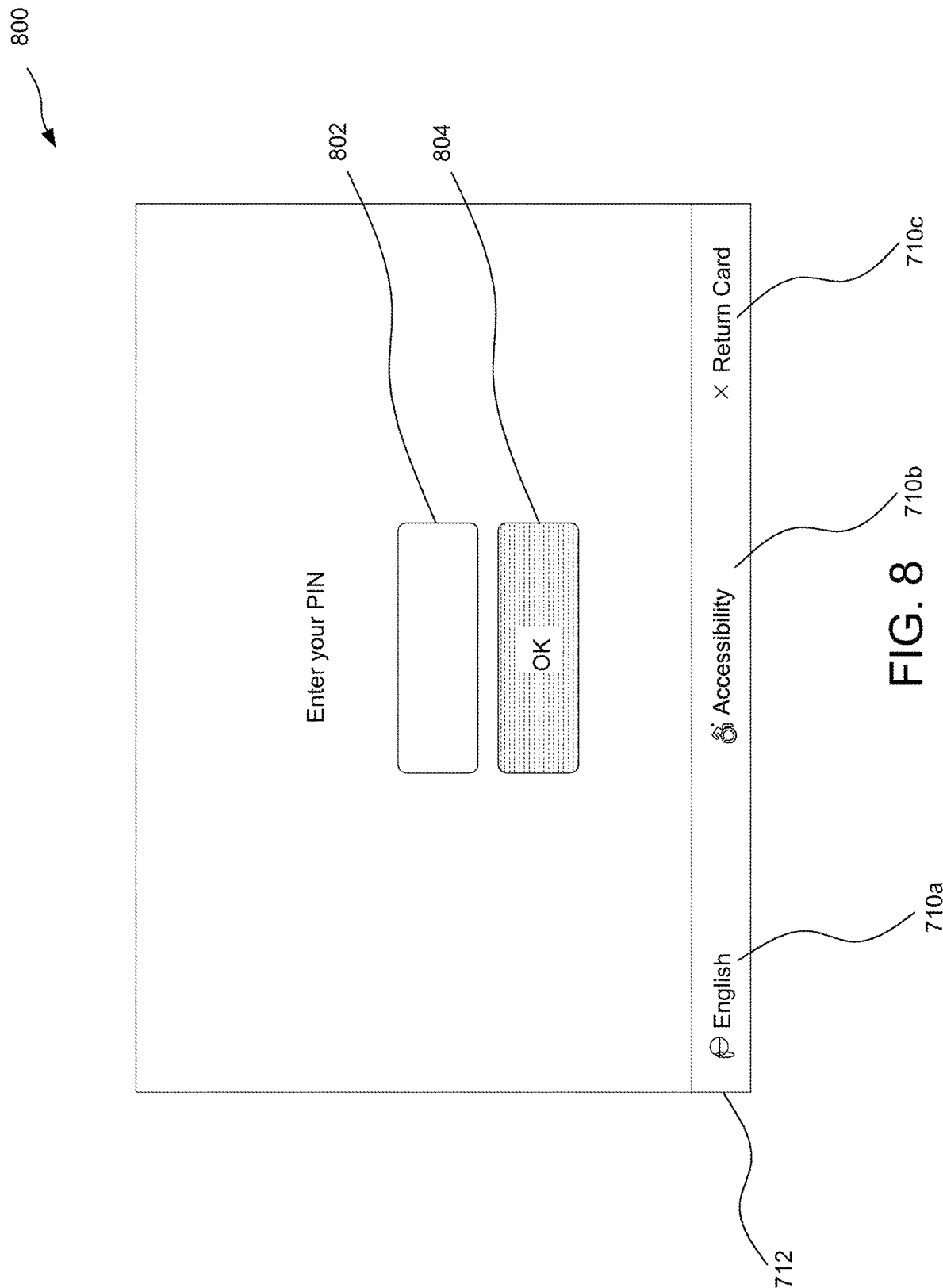
FIG. 8 is an example authentication interface in accordance with example embodiments of the present disclosure.

The displayed selectable options 702 in FIG. 7 include an option 702a for providing express physical output (e.g., express withdrawal of cash), an option 702b for providing physical output (e.g., regular withdrawal of cash), an option 702c for providing physical input (e.g., deposit of cash and/or check), and an option 702d for performing a data transfer between first-party accounts. The welcome interface 700 also provides a selectable option 704 for displaying more available actions.

The welcome interface 700 in this example also includes selectable general options 710a-710c (generally referred to as general options 710). The general options 710 may include options concerning general operation of the automated teller device 100, and may not be related to any specific action or workflow performed using the automated teller device 100. In the shown embodiment of FIG. 7, the general options 710 are provided in a lower portion 712 of the welcome interface 700, for example, in bar, panel or frame at the bottom of the welcome interface 700. The general options 710 in this example include an option 710a for returning to a previous interface in the sequence of interfaces, an option 710b for displaying an accessibility options interface, and an option 710c to cancel the current action (in this case, the exchange of data using physical input). In the shown embodiment of FIG. 7, the option 710a is displayed on the left side of the lower portion 712, the option 710b is displayed at the middle of the lower portion 712, and the option 710c is displayed on the right side of the lower portion 712. Other locations for the general options 710 may be used. The general options 710 may each be provided at the same location over a plurality of interfaces during the session, which may help a user to more easily find each of the general options 710. In particular, the location of the option 710b may enable a user with limited mobility and/or limited reach to more easily select the option 710b for displaying the accessibility options interface.

The welcome interface 700 may also include a message 714. In the shown embodiment, the message is a greeting comprising the text "Welcome" and the "What would you like to do first?" In some examples, the greeting 714 may include non-sensitive customized information based on account information, such as a name associated with the account. Such customized information may be obtained via communication between the automated teller device 100 and the first-party server 306. For example, such information may be provided to the automated teller device 100 together with identification of the account(s) associated with the access card.

The authentication interface 800 enables receipt of input of an authentication code associated with the account. The authentication interface 800 provides an input field 802 for entry of an authentication code (e.g., PIN) associated with the account (e.g., as identified via the inserted access card). When multiple accounts are associated with the access card, the same authentication code may be used for all of the accounts. In this sense, the authentication code may also be considered to be an authentication code that has been set for the access card. For example, a user may use the keypad 104 of the automated teller device 100 to provide input into the input field 802. The keypad 104 may also provide the ability to backspace or cancel input. Other input mechanisms may also be used. The authentication interface 800 provides a confirmation button 804 to confirm entry of the authentication code. The authentication interface 800 also provides the general options 710 as discussed above. When the confirmation button 804 is selected, the input into the input field 802 is received by the automated teller device 100. In some examples, instead of selecting the confirmation button 804, the user may use a physical button (e.g., a physical confirmation button or "OK" button, which may be part of the keypad 104) to confirm entry of the authentication code. Input using a physical confirmation button may be interpreted to be selection of the confirmation button 804. It should be generally understood that, in the present disclosure, selection of any confirmation button may be alternatively input using a physical confirmation button, such as an "OK" button on the keypad.

Configuration of Accessibility Options

Figure 5:
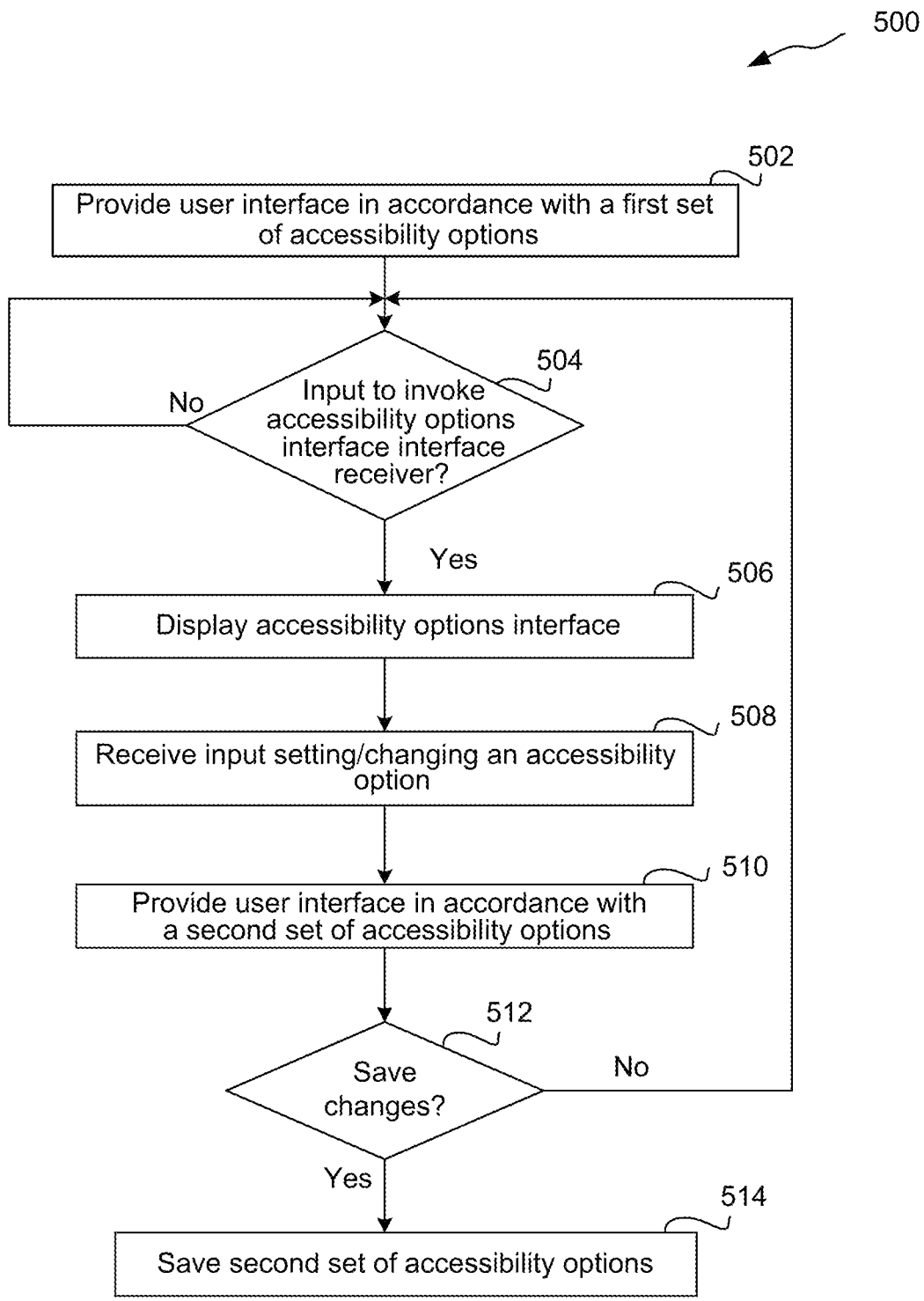
FIG. 5 is a flowchart of a method of operating an automated teller device in accordance with another example embodiment of the present disclosure.

FIG. 5 is a flowchart of an example method 500 for operating an automated teller device 100 in accordance with an example embodiment of the present disclosure. The method 500 may be performed by the automated teller device 100, for example, by the processing unit 126. The method 500 may be implemented during a session with the automated teller device, for example, as a user interface sequence. The method 500 may be implemented together with other methods discussed herein to provide a sequence of interfaces to set and/or apply accessibility settings.

At operation 502, a user interface of the automated teller device 100 is provided in accordance with a first set of accessibility options. The provision of the user interface of the automated teller device 100 comprises displaying a first GUI screen in accordance with the first set of accessibility options and optionally providing audio support in accordance with the first set of accessibility options. The first set of accessibility options may define that accessibility options are disabled, that subset of accessibility options are enabled, or that all accessibility options are enabled and the settings of any enabled accessibility options (e.g., screen options, audio support/playback options, etc.). The provision of the user interface of the automated teller device 100 may comprise playing or reproducing audio in accordance with audio support options of the first set of accessibility options.

At operation 504, the processing unit 126 monitors for input to invoke an accessibility options interface for configuring (e.g., setting or changing) accessibility options. In response to receiving input to invoke an accessibility options interface, processing proceeds to operation 506 at which the accessibility options interface is displayed.

The accessibility options interface for configuring (e.g., setting or changing) accessibility options may be invoked by selecting an option for displaying the accessibility options interface. In some examples, an option for displaying the accessibility options interface may be provided by each GUI screen. Each GUI screen may include the general options toolbar 710 of the welcome interface 700 and the authentication interface 800 that includes an option 710b for displaying the accessibility options interface. In the shown examples, the accessibility option 710b is an onscreen button located in a horizontal toolbar, such as the general options toolbar 710, which is located at a bottom of each of the screens of the graphical user interface. The onscreen button is defined by a predefined location on the horizontal toolbar and may be identified by one or more representative icons and/or descriptive text as shown in the example interfaces.

Figure 9:
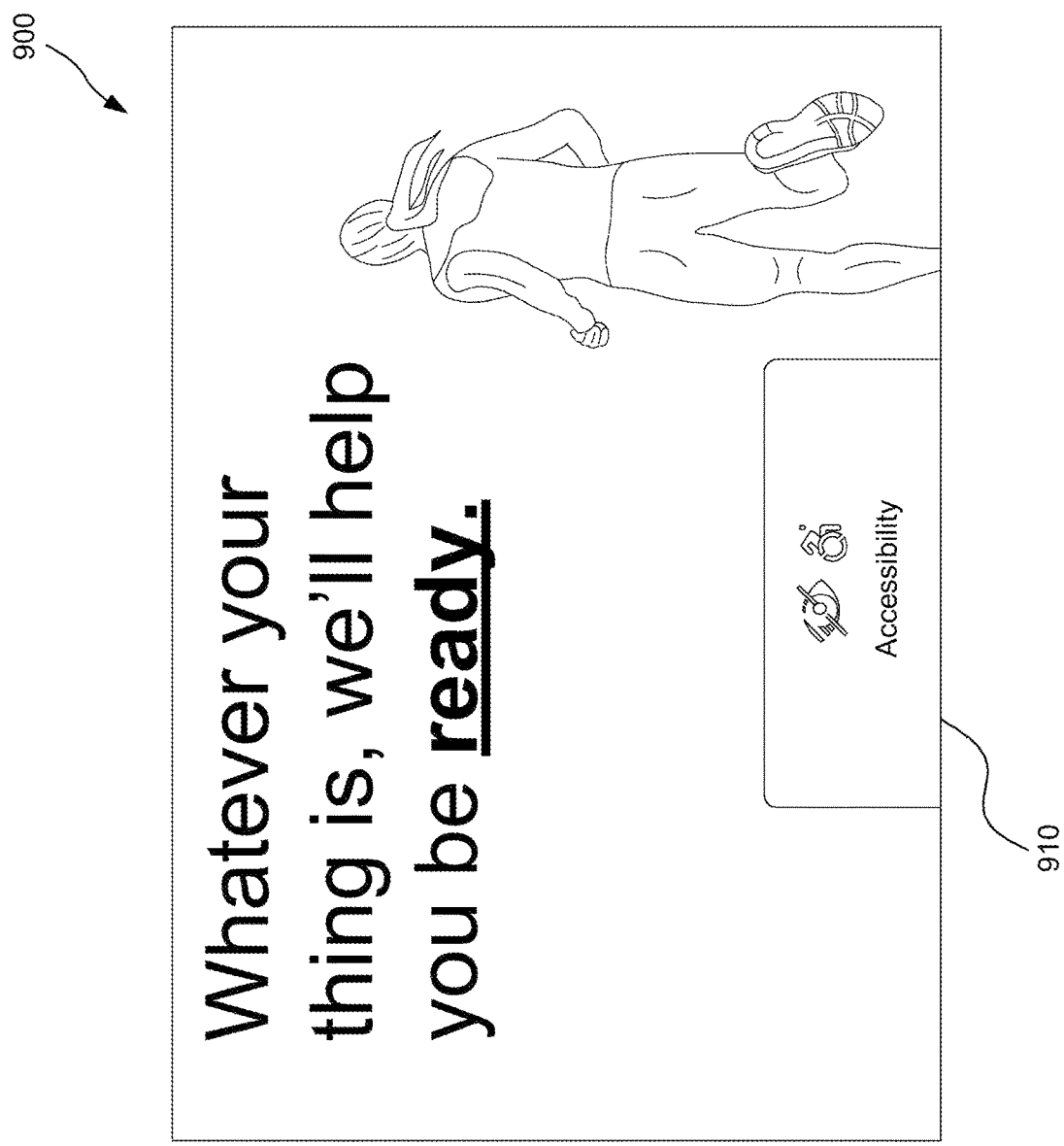
FIG. 9 is an example start interface in accordance with example embodiments of the present disclosure.

The accessibility options interface which, in some examples, may be invoked at the start of a session either before or after an access card is inserted into the card reader 112 via the cart slot 110 or before or after another authentication device is coupled to the automated teller device 100. In some examples, the GUI of the automated teller device 100 may include a start interface 900 as shown in FIG. 9 before an access card is inserted into the card reader 112 via the cart slot 110 or other authentication device is coupled to the automated teller device 100. As shown in FIG. 9, the start interface 900 includes an option 910 for displaying the accessibility the options screen before an access card is inserted into the card reader 112 via the cart slot 110 or before another authentication device is coupled to the automated teller device 100, and before any data is extracted from the access card or other authentication device. In the shown example, the accessibility option 910 is an onscreen button similar to that described above.

Figure 10:
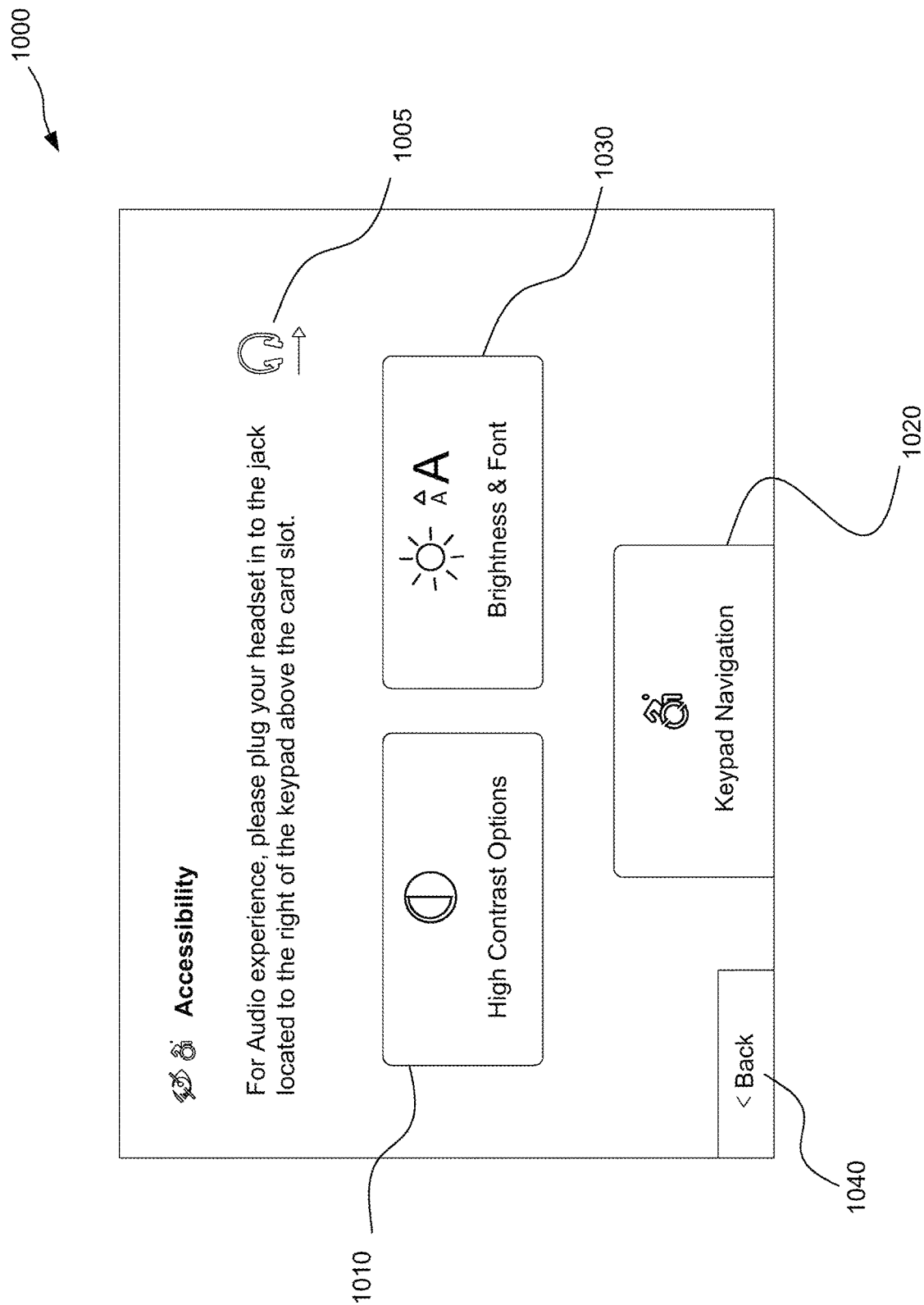
FIG. 10 is an example accessibility options interface in accordance with example embodiments of the present disclosure.

At operation 506, the processing unit 126 causes the accessibility options interface to be displayed on the display 102. FIG. 10 is an example accessibility options interface 1000 in accordance with an example embodiment of the present disclosure. The accessibility options interface 1000 includes a prompt 1005 to insert a headset plug for an audio experience, a Screen Options ("High Contrast Options") button 1010 for invoking a Screen Options interface for configuring the screen contrast and background displayed on the display 102, a "Keypad Navigation" button 1020 for enabling an accessibility keypad mode, a "Brightness & Font Size" button 1030 for invoking a Brightness & Font Size interface for configuring the screen brightness of the display 102 and the Font Size/Text size of displayed text, and a back button 1040 for returning to a previous interface screen. The back button 1040 may be context-sensitive and may only be present when the accessibility options interface 1000 is invoked from an interface other than the start interface 900.

At operation 508, input to change one or more accessibility options is received by the processing unit 126 via the keypad 104 and/or display 102 when the display is a touchscreen.

At operation 510, the user interface of the automated teller device 100 is automatically updated in response to the received input to change one or more accessibility options to provide a user interface of the automated teller device 100 in accordance with a second set of accessibility options, thereby automatically applying the change(s). The second set of accessibility options is dependent on the received input to change one or more accessibility options. The provision of the user interface of the automated teller device 100 comprises displaying a second GUI screen in accordance with the second set of accessibility options and optionally providing audio support in accordance with the second set of accessibility options. The second GUI screen may be the same as the first GUI screen when the received input to change one or more accessibility options changed only audio support options. The provision of the user interface of the automated teller device 100 may comprise playing or reproducing audio in accordance with audio support options of the second set of accessibility options, which may be the same or different than the audio support options of the first set of accessibility options depending on whether the received input to change one or more accessibility options changed any audio support options.

At operation 512, the processing unit 126 may prompt the user whether to save the second set of accessibility options in response to a determination that the second set of accessibility options is different than the first set of accessibility options (which may be, for example, that the accessibility options are disabled).

Figure 22:
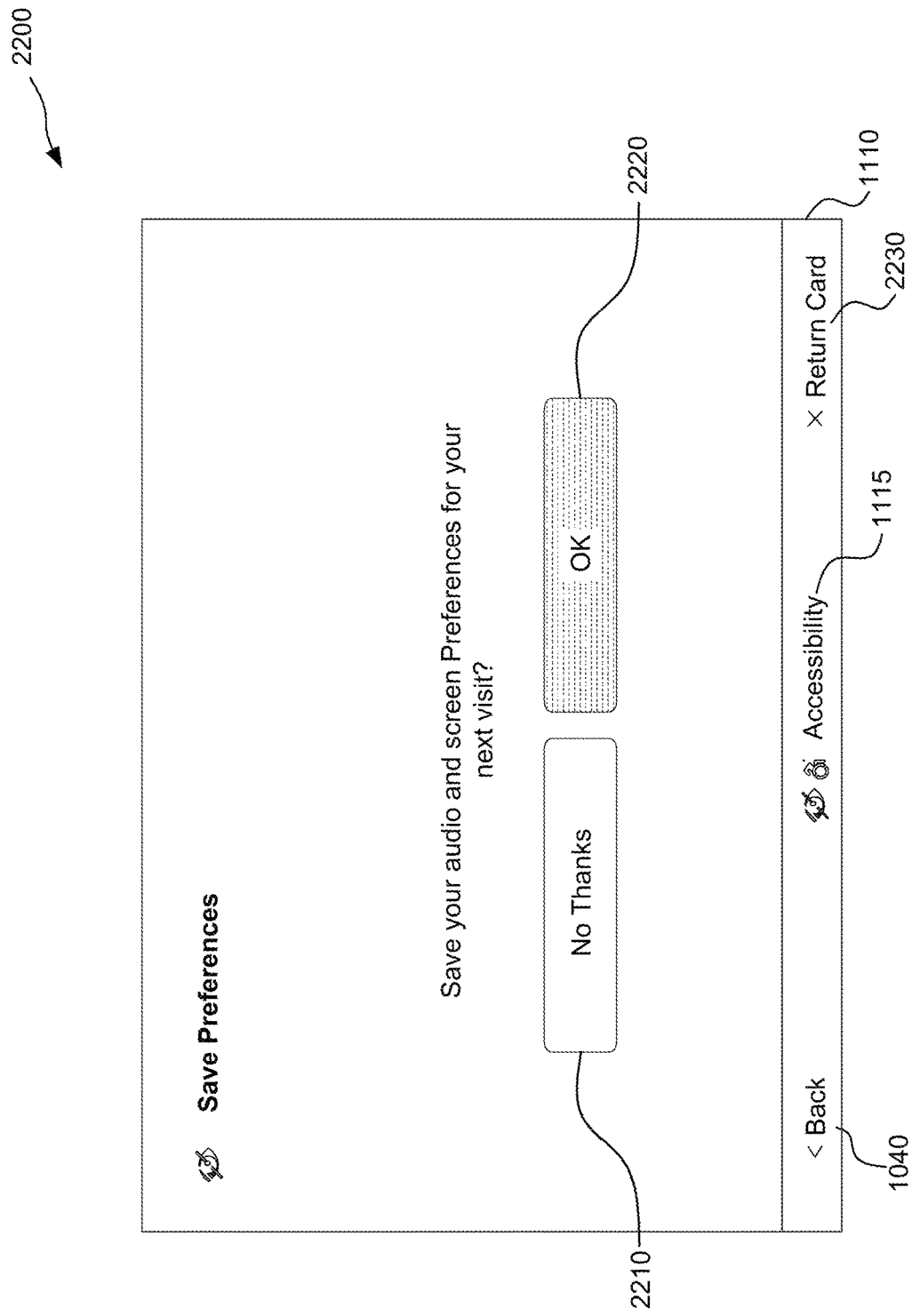
FIG. 22 is an example save preferences interface in accordance with an example embodiment of the present disclosure.

In response to input to save the second set of accessibility options, the processing proceeds to operation 514 at which the second set of accessibility options are stored. FIG. 22 illustrates a save preferences interface 2200 in accordance with one example embodiment of the preset disclosure. The save preferences interface 2200 may be displayed at the end of a session or after making a change to the accessibly options, depending on the embodiment.

Storing the second set of accessibility options comprises sending the second set of accessibility options from the automated teller device 100 to the backend server, for example, the first-party server 306 owned or operated by the first-party service provider that owns or operates the automated teller device 100. The first-party server 306, in response to receiving the second set of accessibility options for the account, stores the second set of accessibility options in association with the account in an account database. When the first-party server 306 determines that the authentication device is associated with the account that is managed by a third-party service provider, the first-party server 306 may further communicate with a service provider network to sending the second set of accessibility options to the third-party service provider which stores the second set of accessibility options in association with the account in an account database when received. The second set of accessibility options, stored with the first-party server 306 or third-party server 310, can be accessed by any automated teller device 100 connected to the communication network 304 at the start of a session to automatically apply the second set of accessibility options on the automated teller device 100.

Alternatively, rather than prompting the user for input, all changes to the accessibility options may be automatically saved/stored.

In some examples, only one accessibility option may be changed at a time. To change multiple accessibility options, the method 500 is repeated. In other examples, multiple accessibility options may be changed at a time.

Figure 11:
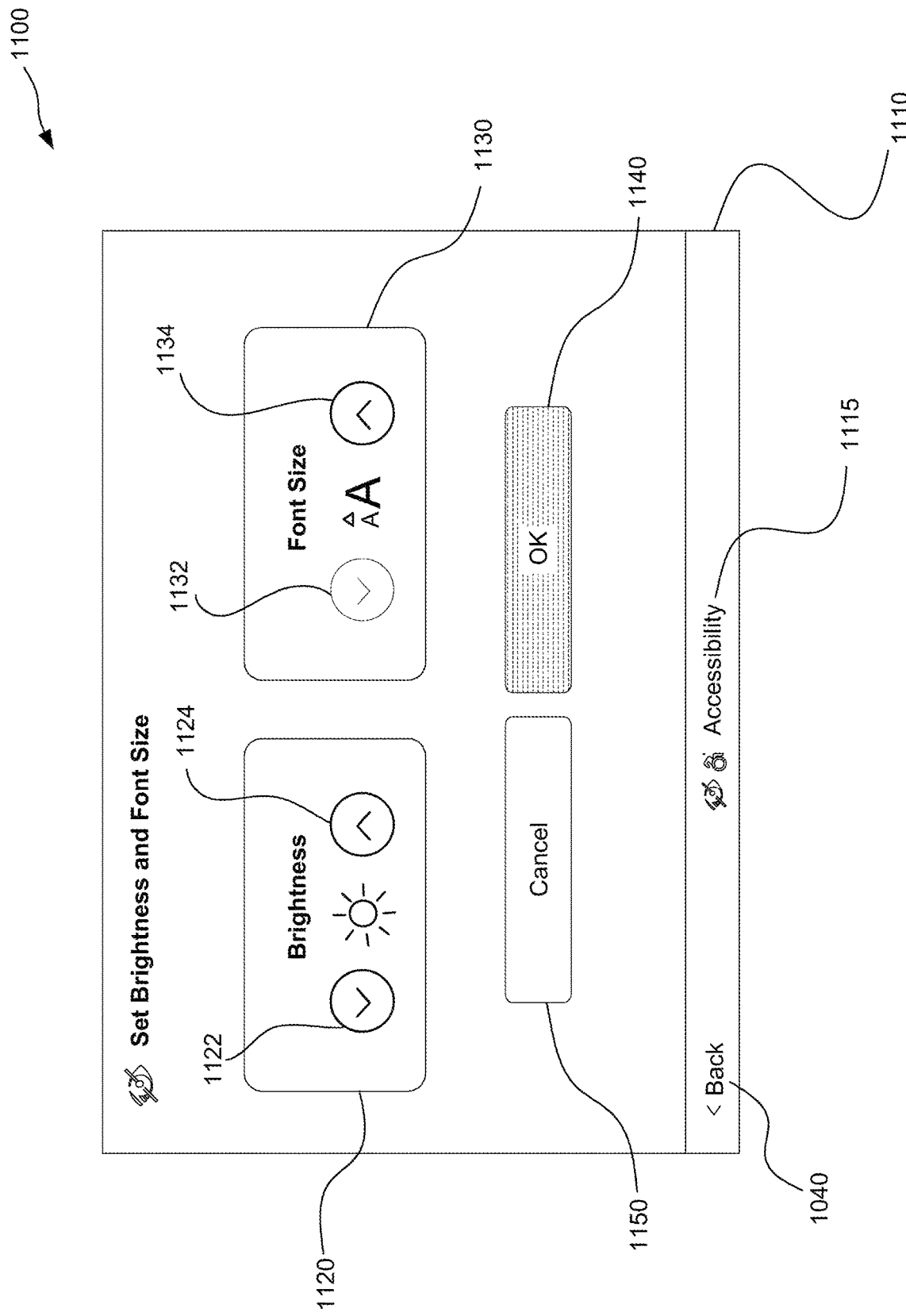
FIG. 11 is an example brightness & font size interface in accordance with an example embodiment of the present disclosure.

FIG. 11 is an example Brightness & Font Size interface 1100 in accordance with an example embodiment of the present disclosure invoked by selecting the "Brightness & Font Size" button 1030" of the accessibility options interface 1000. The Brightness & Font Size interface 1100 includes an interface 1120 for configuring the screen brightness of the display 102 via a decrease/down button 1122 and an increase/up button 1124. The Brightness & Font Size interface 1100 also includes an interface 1130 for configuring the displayed text size via a decrease/down button 1132 and an increase/up button 1134. The Brightness & Font Size interface 1100 also includes a confirmation ("OK") button 1140 for confirming and accepting any changes, and a cancel button 1150 for rejecting any changes. The Brightness & Font Size interface 1100 also includes a horizontal toolbar 1110 including the back button 1040 and a button 1115 for displaying the accessibility options interface 1000.

Figure 12A:
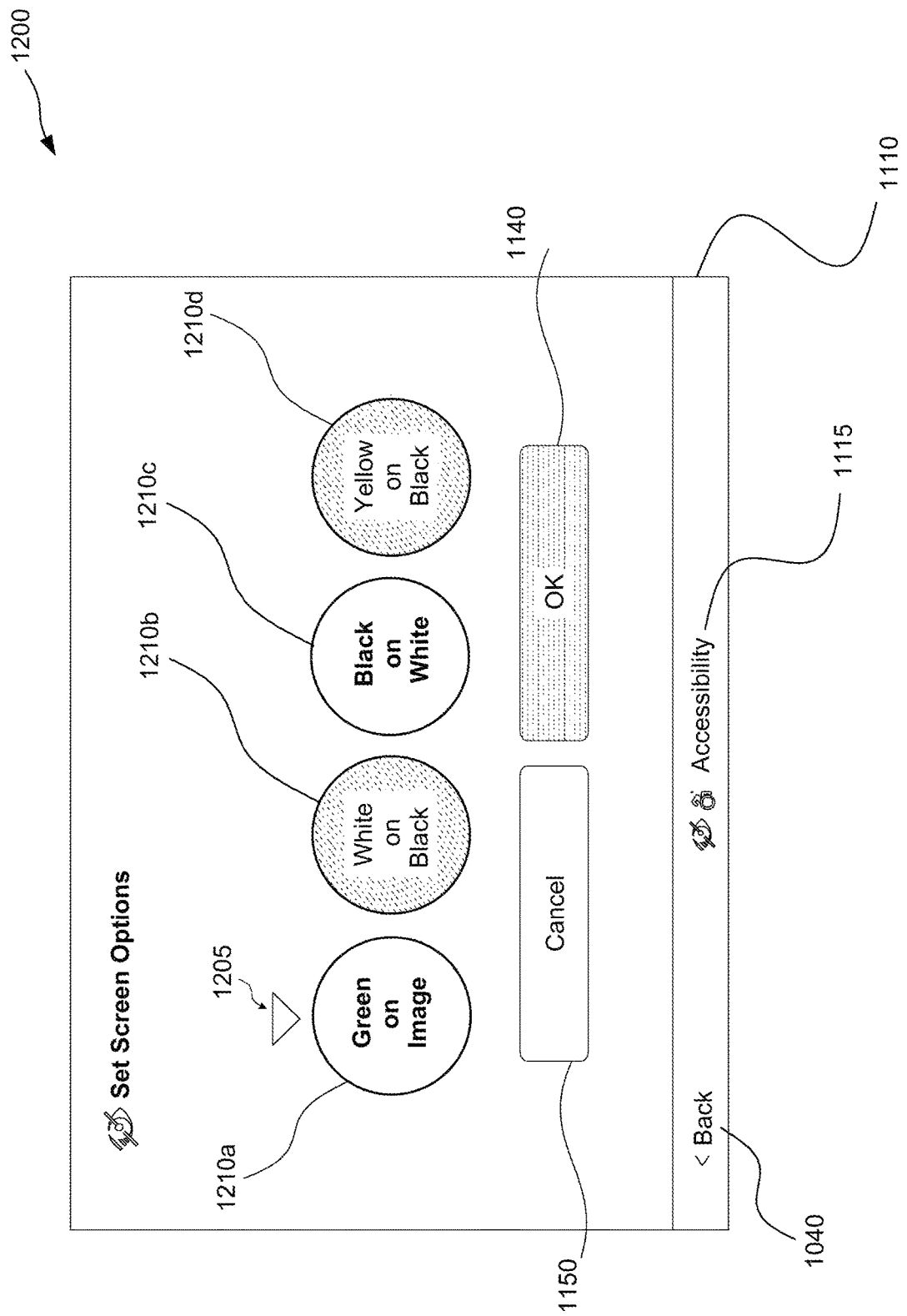
FIGS. 12A and 12B are examples of a screen options interface in accordance with an example embodiment of the present disclosure.
Figure 12B:
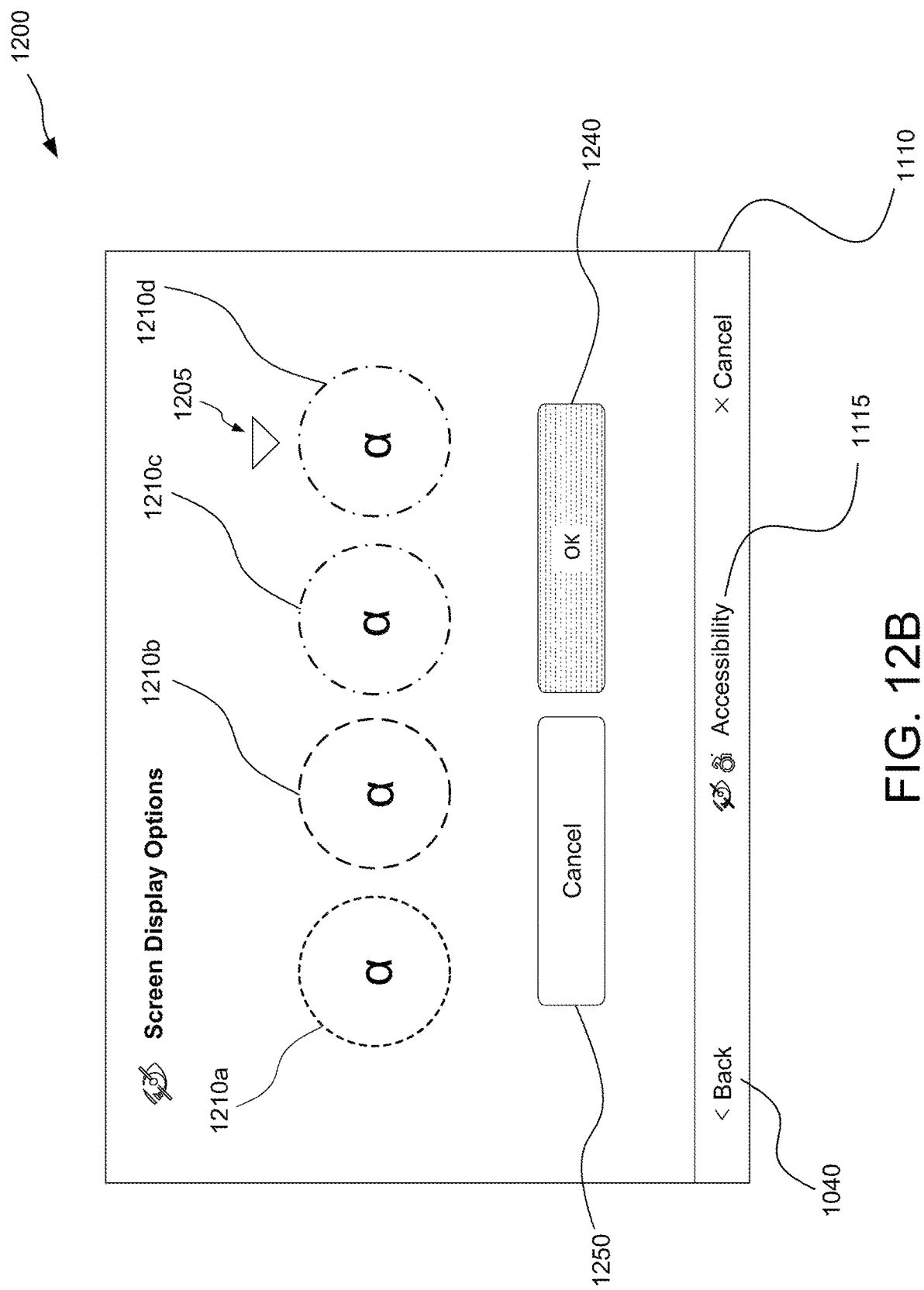

FIG. 12A is an example Screen Options interface 1200 in accordance with an example embodiment of the present disclosure invoked by selecting the Screen Options ("High Contrast Options") button 1010 of the accessibility options interface 1000. The Screen Options interface 1200 includes a plurality of selectable options 1210a-1210d (generally referred to as options 1210) which may be selected to set a screen option. In the shown example, the screen options comprise comprising text (e.g., green text) and a background image, screens comprising white text and a black background, screens comprising black text and a white background, and screens comprising yellow text and a black background. The currently selected screen option is shown by an onscreen indicator 1205 which, in the shown example, is an arrow. In the example of FIG. 12A, the currently selected screen option is text and a background image. FIG. 12B is an alternate example Screen Options interface 1200 in which the currently selected screen option is screens comprising yellow text and a black background.

FIG. 13 is an example Keypad Navigation interface 1300 in accordance with an example embodiment of the present disclosure invoked by selecting the "Keypad Navigation" button 1020 of the accessibility options interface 1000. The Keypad Navigation interface 1300 is informational only and illustrates a keypad mapping of the accessibility keypad mode. Selecting the "Keypad Navigation" button 1020 automatically enables the accessibility keypad mode for the automated teller device 100. The Keypad Navigation interface 1300 may be complimented by audio describing the keys and associated actions of the key mapping of the accessibility keypad mode, possibility with referential or relative directional cues or guides to assist persons with visual challenges (e.g., the right or scroll right button is located at the 3 o'clock relative to the keypad, etc.)

Figure 14:
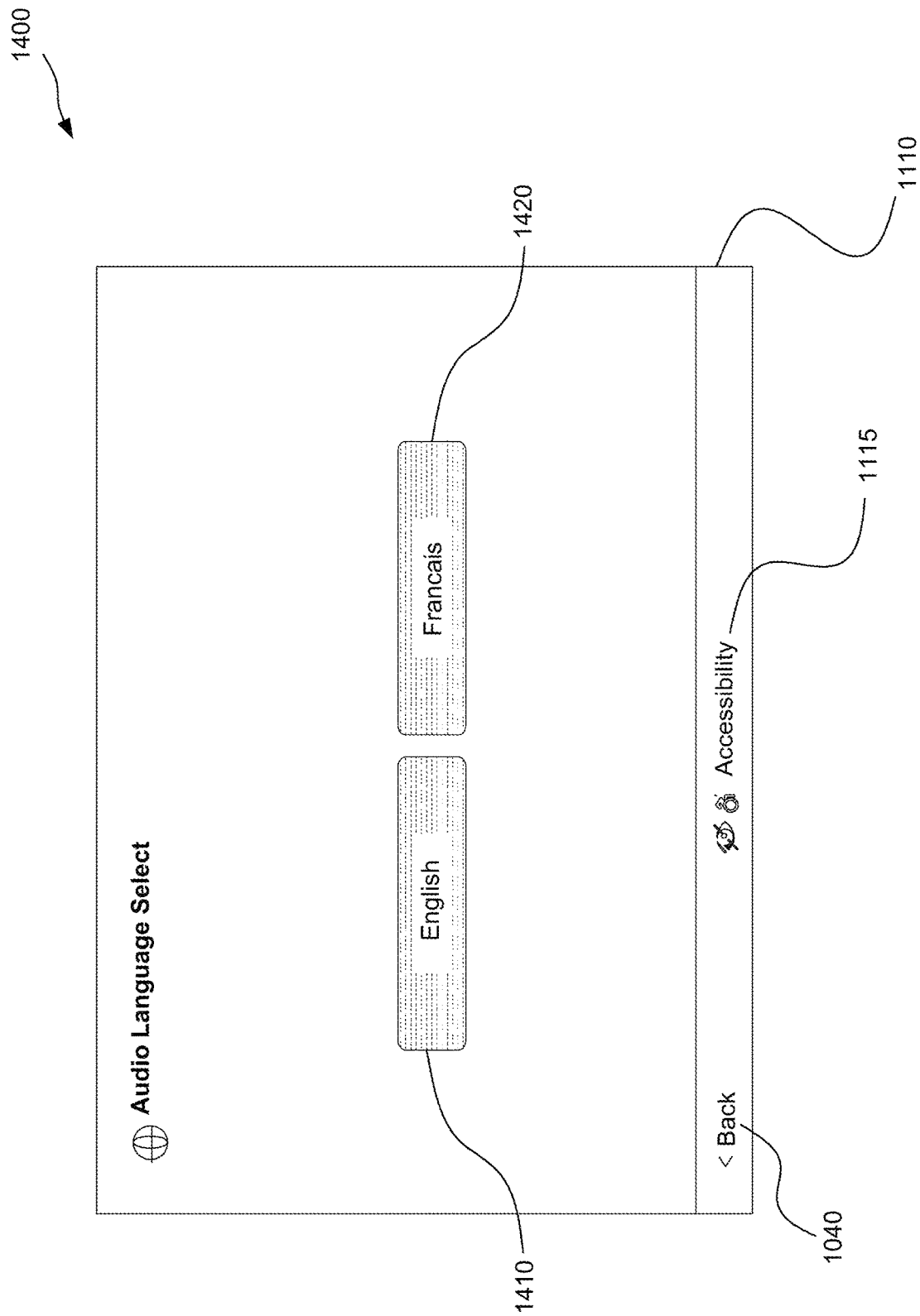
FIG. 14 is an example audio language select interface in accordance with an example embodiment of the present disclosure.

FIG. 14 is an example Audio Language Select interface 1400 in accordance with an example embodiment of the present disclosure. The Audio Language Select interface 1400 may be displayed when a headset plug is inserted into the headset jack of the automated teller device 100, for example, in response to the prompt 1005 of the accessibility options interface 1000 when an audio language has not been previously selected and stored in the accessibility options of the account. In some examples, audio support may be enabled at any time by inserting the headset jack of the automated teller device 100. The Audio Language Select interface 1400 is optional and may be omitted in other examples in which only one language is supported or an audio language has been previously selected and stored in the accessibility options of the account. FIG. 14 shows an example in which multiple languages are supported, namely English and French (Français), and two language buttons 1410 and 1420 are provided to select between English and French, respectively.

A keypad navigation for audio interface may be displayed when audio support is enabled, possibly whenever audio support is enabled. The keypad navigation for audio interface may be displayed directly in response to detection that a headset plug has been inserted into the headset jack of the automated teller device 100 when the Audio Language Select interface 1400 is not displayed. Alternatively, the keypad navigation for audio interface may be displayed after a language is selected from the Audio Language Select interface 1400 via one of the onscreen buttons. FIG. 15 is an example Keypad Navigation for Audio interface 1500 in accordance with an example embodiment of the present disclosure. The Keypad Navigation for Audio interface 1500 is informational only and illustrates a keypad mapping of the accessibility keypad mode when audio support is enabled. The Keypad Navigation for Audio interface 1500 may be complimented by audio describing the keys and associated actions of the key mapping of the accessibility keypad mode, possibility with referential or relative directional cues or guides to assist persons with visual challenges (e.g., the right or scroll right button is located at the 3 o'clock relative to the keypad, etc.)

Figure 16:
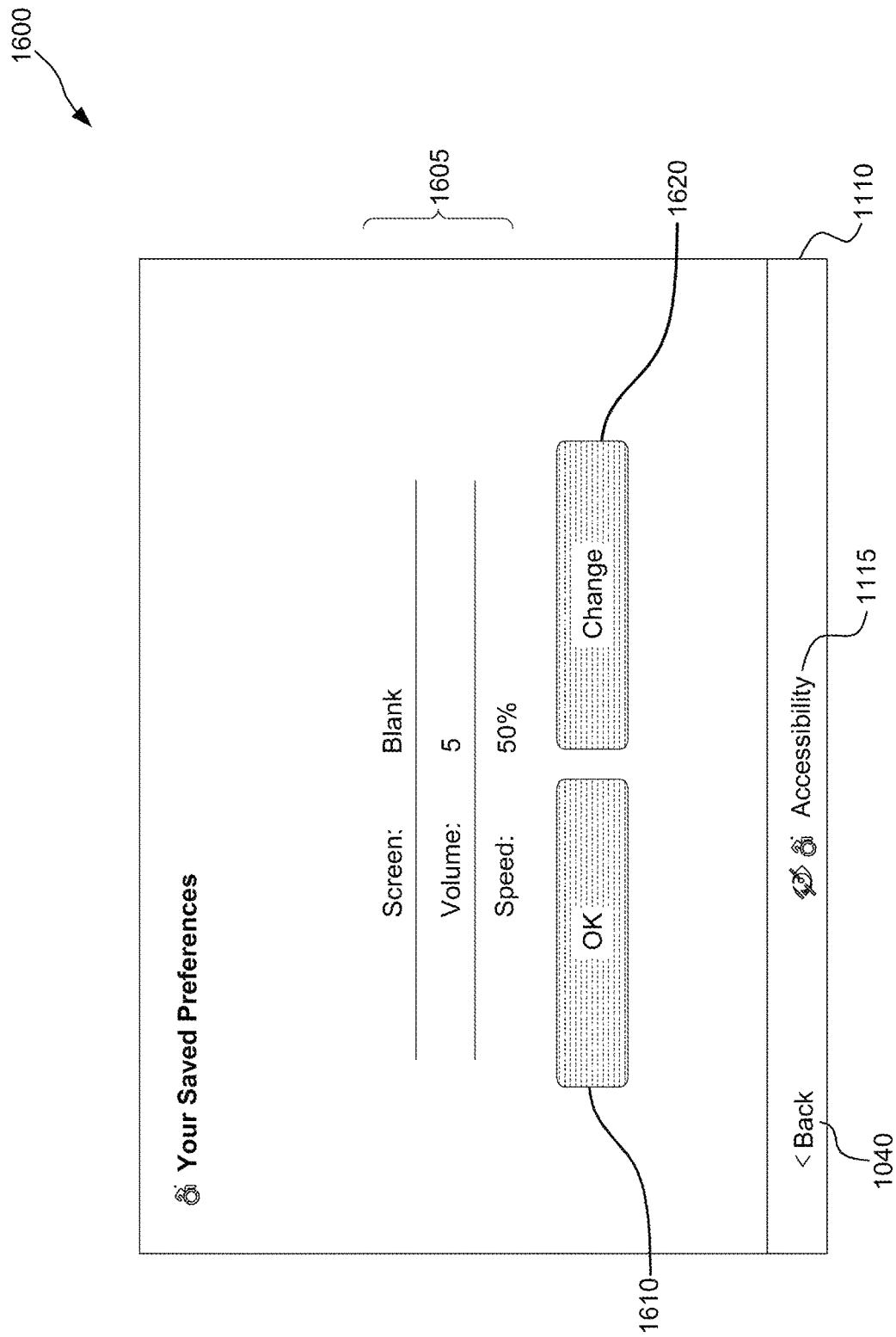
FIG. 16 is an example saved preferences for audio interface in accordance with an example embodiment of the present disclosure.

FIG. 16 is an example Saved Preferences for Audio interface 1600 in accordance with an example embodiment of the present disclosure. The Saved Preferences for Audio interface 1600 may be displayed after the Keypad Navigation for Audio interface 1500 when previously selected and stored audio options exist in the accessibility options of the account. The Saved Preferences for Audio interface 1600 displays the saved preferences for audio 1605 which, in the shown example, include a screen option, an audio volume, and an audio speed. Other audio options may be provided in other examples. The Saved Preferences for Audio interface 1600 also includes a confirmation button 1610 to confirm and accept the saved preferences and a change button 1620 to change the saved preferences. When the change button 1620, the user is able to change the saved preferences via corresponding input or interfaces which are provided to the user.

Figure 17A:
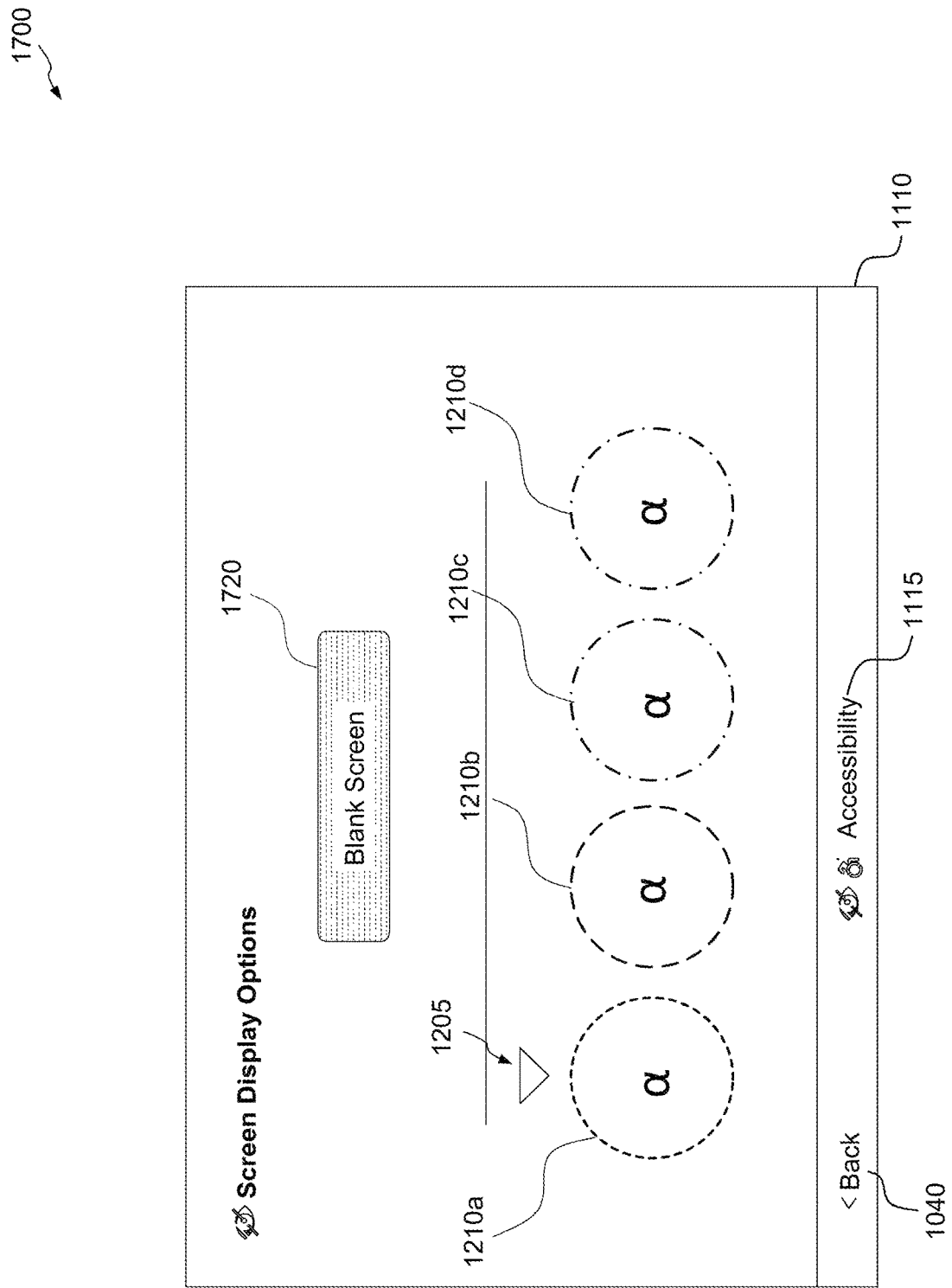
FIGS. 17A and 17B are examples of a screen options for audio interface in accordance with an example embodiment of the present disclosure.
Figure 17B:
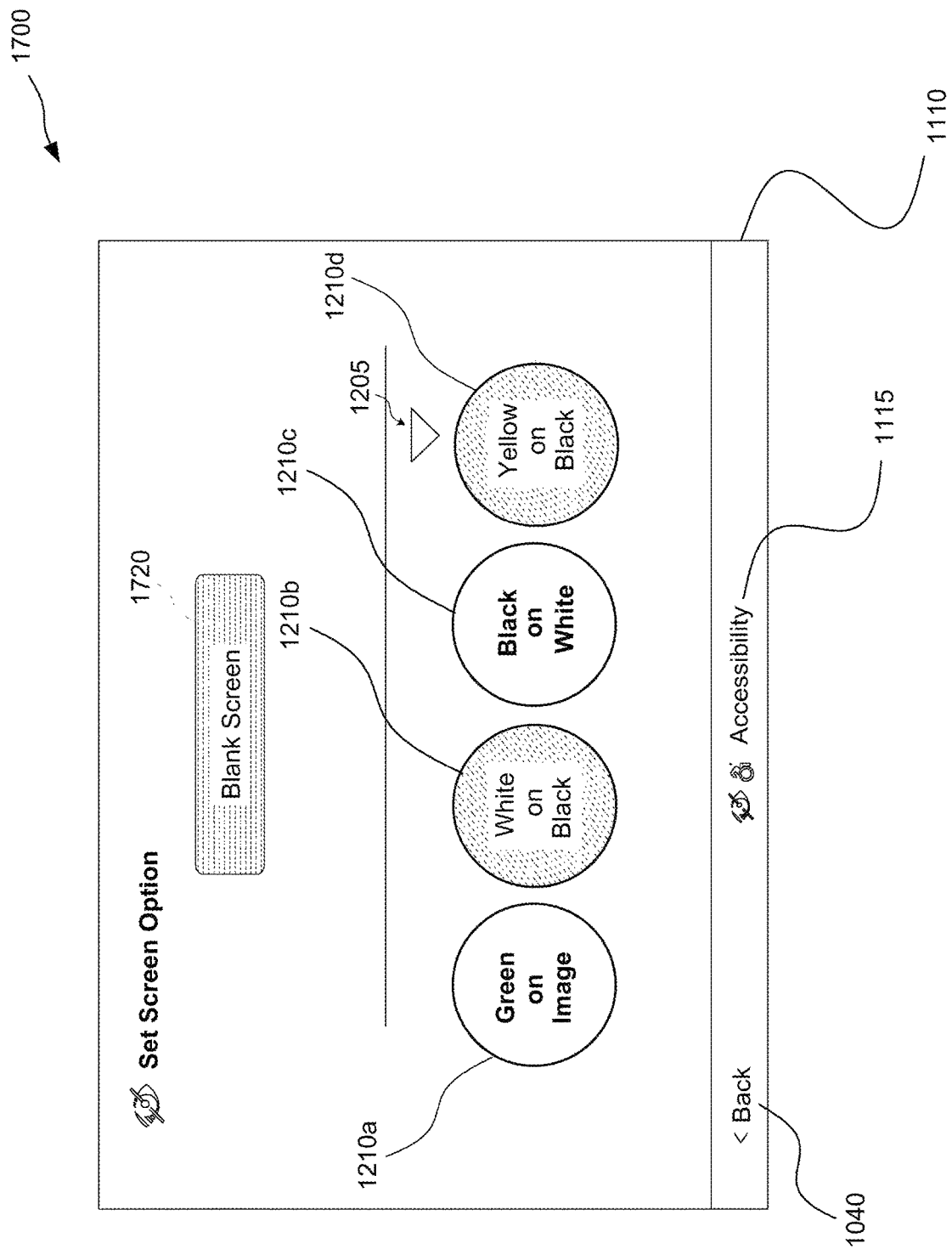
Figure 18:
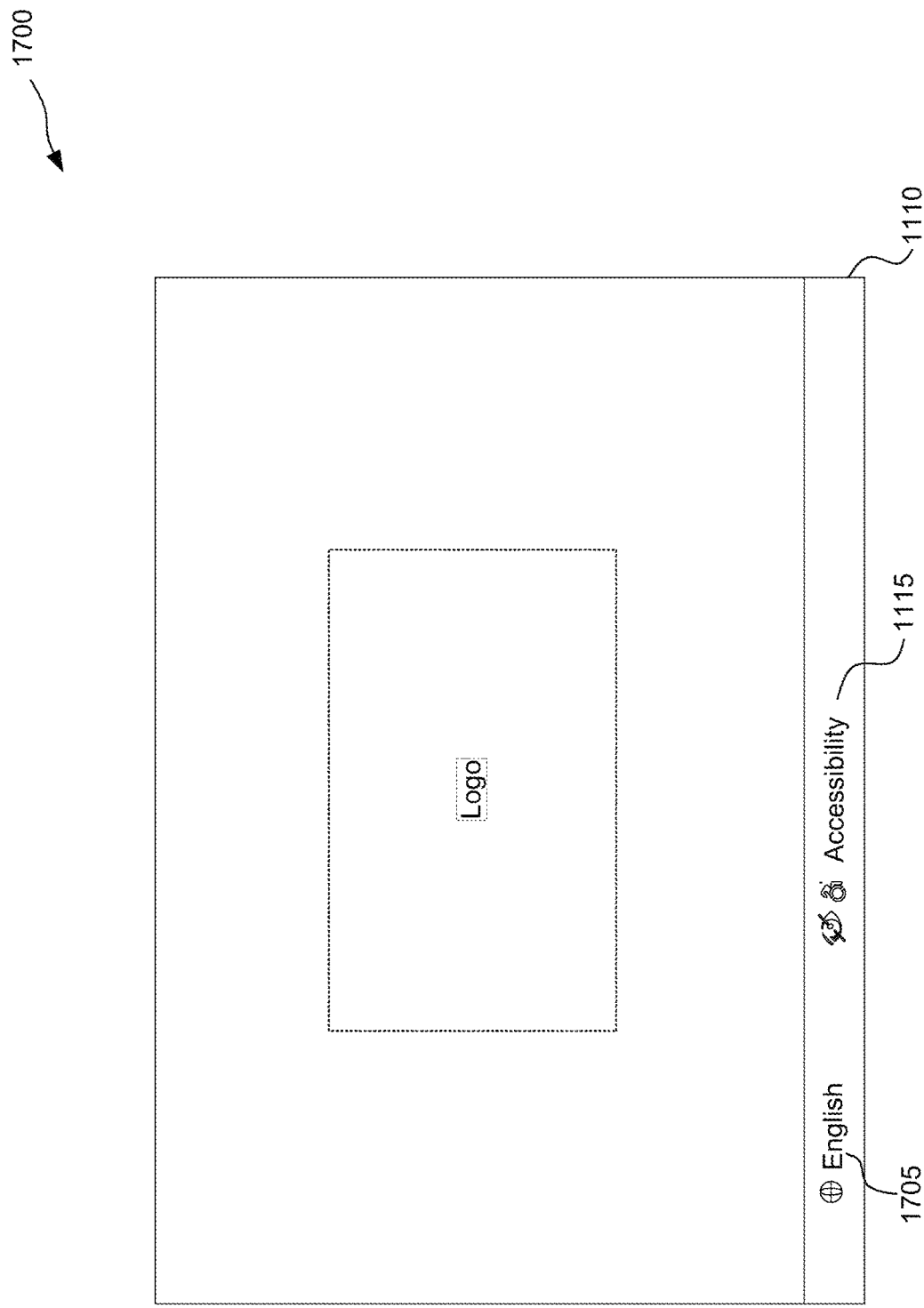
FIG. 18 is an example blank screen in accordance with an example embodiment of the present disclosure.

When no audio options exist in the accessibility options of the account, for example because audio support has not been previously enabled, a Screen Options for Audio interface 1700 is displayed, an example embodiment of which is shown in FIG. 17A. The Screen Options for Audio interface 1700 is similar to the example Screen Options interface 1200 except that a button option 1705 for a blank screen to be displayed during audio is provided. In the example of FIG. 17A, the currently selected screen option is text and a background image. FIG. 17B is an alternate example Screen Options for Audio interface 1700 in which the currently selected screen option is screens comprising yellow text and a black background. FIG. 18 is an example blank screen in accordance with an example embodiment of the present disclosure. The blank screen may display a background image and/or a logo but no information or onscreen buttons other than the horizontal toolbar 1110 which, in the shown example, includes an option button 1705 to change the audio language instead of a back button 1040.

Figure 19:
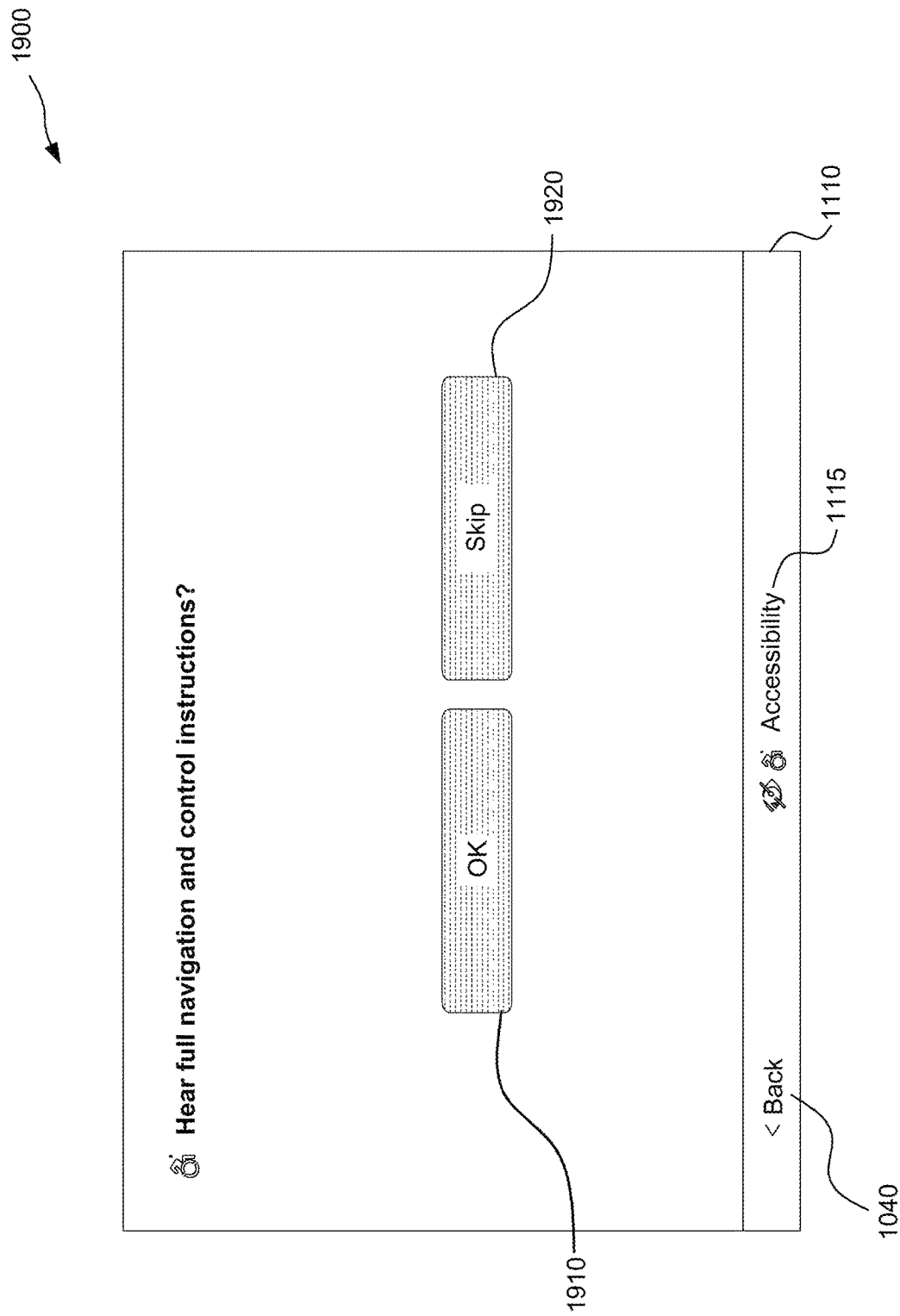
FIG. 19 is an example announce navigation and control instructions interface in accordance with an example embodiment of the present disclosure.

Next, an interface prompting the user for input whether to announce full navigation and control instructions is displayed. FIG. 19 is an example Announce Navigation and Control Instructions interface 1900 in accordance with an example embodiment of the present disclosure including a confirmation button 1910 to confirm and start announcement of the navigation and control instructions and a skip button 1920 to skip the announcement.

Figure 20:
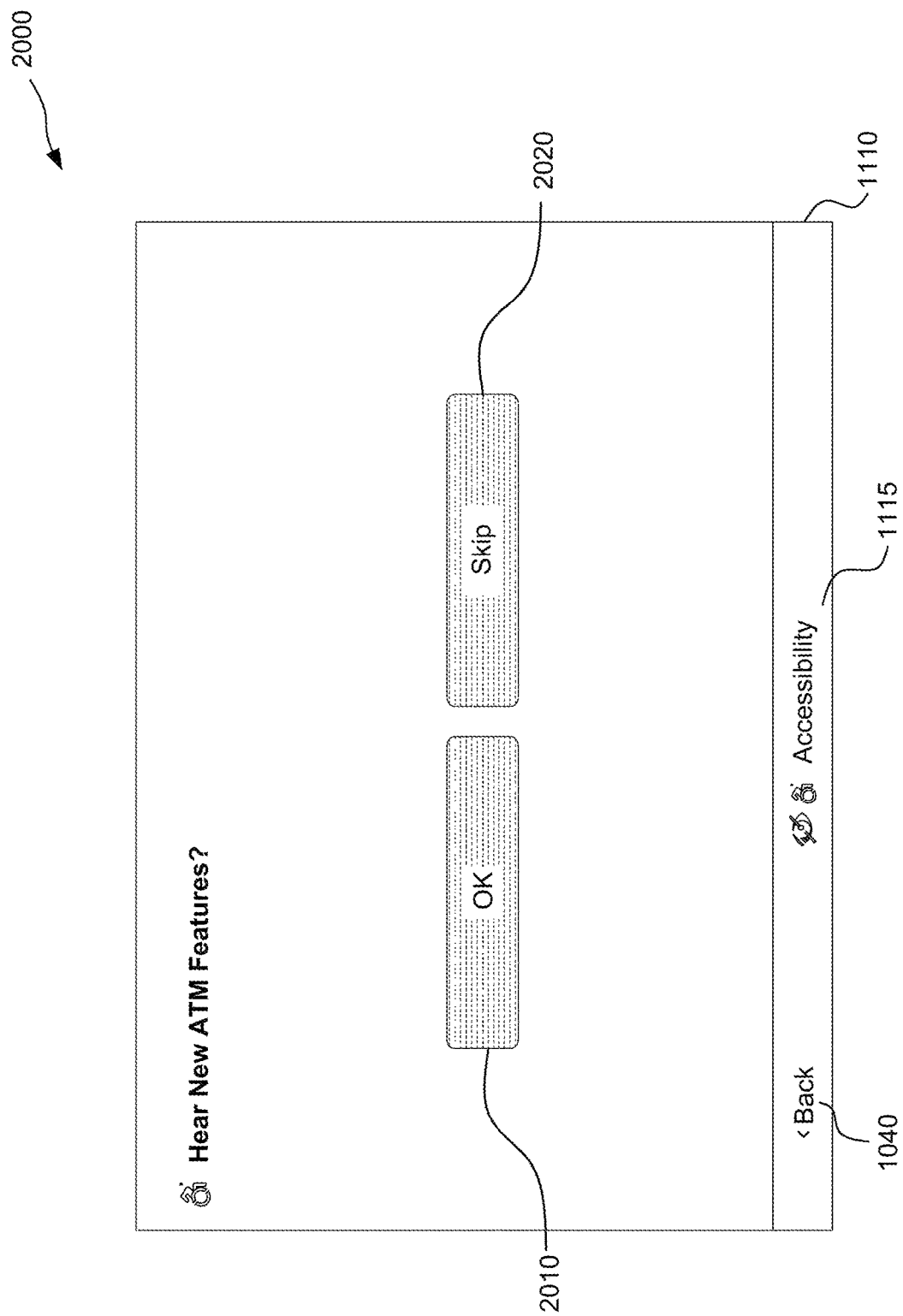
FIG. 20 is an example announce new features interface in accordance with an example embodiment of the present disclosure.

Next, an interface prompting the user for input whether to announce new features of the automated teller device 100 is displayed. This interface is optional and is only displayed when new features are available. FIG. 20 is an example Announce New Features interface 2000 in accordance with an example embodiment of the present disclosure including a confirmation button 2010 to confirm and start announcement of the new features and a skip button 2020 to skip the announcement.

Figure 21:
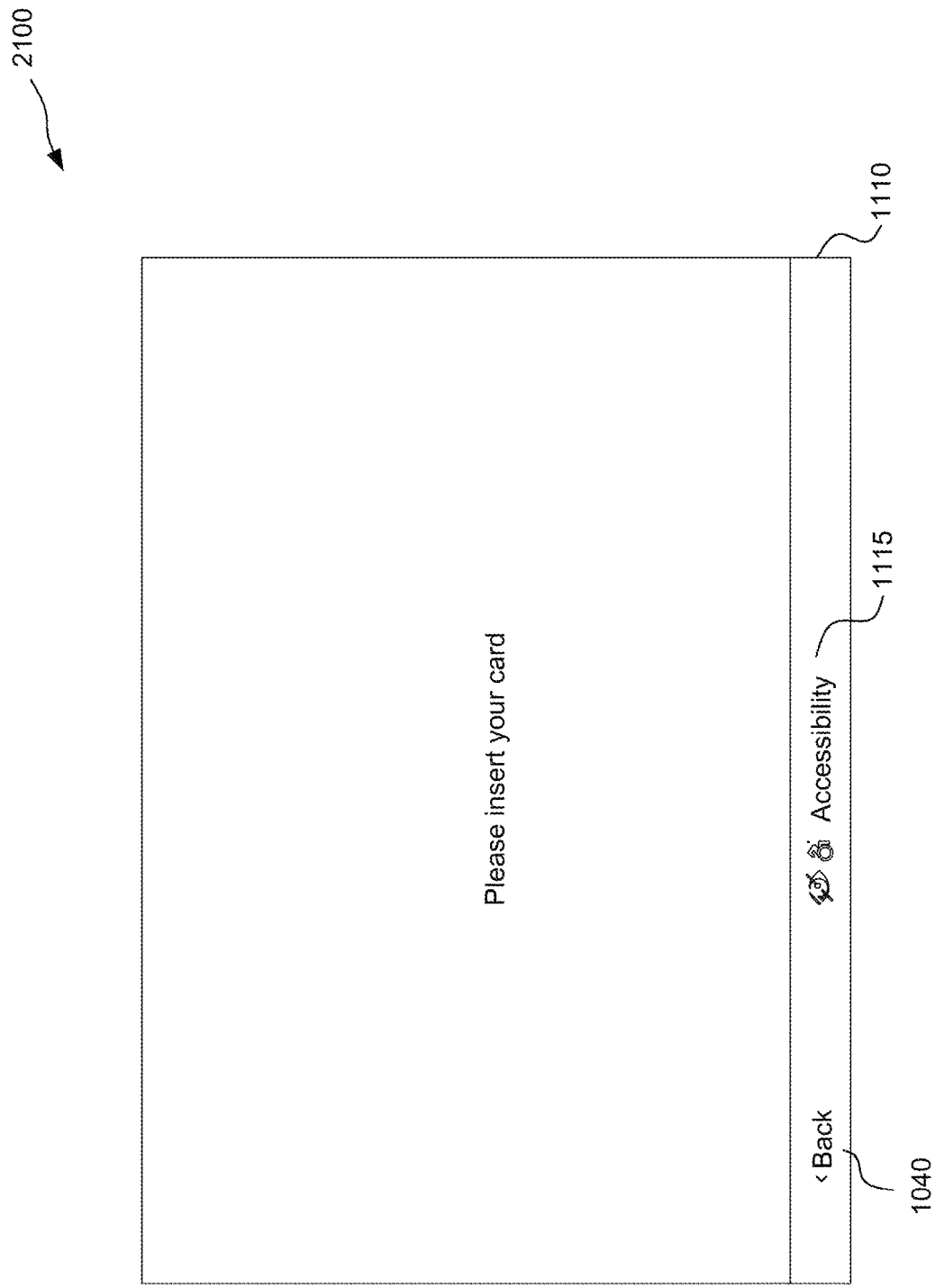
FIG. 21 is an example insert card interface in accordance with an example embodiment of the present disclosure.

FIG. 21 is an example insert card interface 2100 in accordance with an example embodiment of the present disclosure. The insert card interface 2100 is informationally only and prompts the user to insert an access card or other authentication device. The insert card interface 2100 is optional and is only displayed when the accessibility options interface 1000 is invoked from the start interface 900 before an access card or other authentication device is in communication with the automated teller device.

FIG. 22 is an example save preferences interface 2200 in accordance with an example embodiment of the present disclosure. The save preferences interface 2200 also includes a confirmation ("OK") button 2220 for confirming and accepting changes to the accessibly options, and a cancel ("No Thanks") button 2210 for rejecting any changes to the accessibly options. The save preferences interface 2200 may be displayed at the end of a session or after making a change to the accessibly options. In the shown example, the save preferences interface 2200 may be displayed at the end of a session and so includes a "return card" button 2230 as an alternative to the cancel button 2210.

General

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

The coding of software for carrying out the above-described methods described is within the scope of a person of ordinary skill in the art having regard to the present disclosure. Machine readable code executable by one or more processors of one or more respective devices to perform the above-described method may be stored in a machine-readable medium such as the memory of the data manager. The terms "software" and "firmware" are interchangeable within the present disclosure and comprise any computer program stored in memory for execution by a processor, comprising RAM memory, ROM memory, erasable programmable ROM (EPROM) memory, electrically EPROM (EEPROM) memory, and non-volatile RAM (NVRAM) memory. The above memory types are example only, and are thus not limiting as to the types of memory usable for storage of a computer program.

Although the present disclosure is described at least in part in terms of methods, a person of ordinary skill in the art will understand that the present disclosure is also directed to the various elements for performing at least some of the aspects and features of the described methods, be it by way of hardware, software or a combination thereof. Accordingly, the technical solution of the present disclosure may be embodied in a non-volatile or non-transitory machine-readable medium having stored thereon executable instructions tangibly stored thereon that enable a processing device to execute examples of the methods disclosed herein.

All values and sub-ranges within disclosed ranges are also disclosed. Also, although the systems, devices and processes disclosed and shown herein may comprise a specific plurality of elements/components, the systems, devices and assemblies may be modified to comprise additional or fewer of such elements/components. For example, although any of the elements/components disclosed may be referenced as being singular, the embodiments disclosed herein may be modified to comprise a plurality of such elements/components.

Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods.

Features from one or more of the above-described embodiments may be selected to create alternate embodiments comprised of a subcombination of features which may not be explicitly described above. In addition, features from one or more of the above-described embodiments may be selected and combined to create alternate embodiments comprised of a combination of features which may not be explicitly described above. Features suitable for such combinations and subcombinations would be readily apparent to persons skilled in the art upon review of the present application as a whole.

In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein and in the recited claims intends to cover and embrace all suitable changes in technology.

The term "processor" may comprise any programmable system comprising systems using microprocessors, nanoprocessors or the like, reduced instruction set circuits (RISC), ASICs, logic circuits, and any other circuit or processor capable of executing the functions described herein. The term "database" may refer to either a body of data, a relational database management system (RDBMS), or to both. As used herein, a database may comprise any collection of data comprising hierarchical databases, relational databases, flat file databases, object-relational databases, object-oriented databases, and any other structured collection of records or data that is stored in a computer system. The above examples are example only, and thus are not intended to limit in any way the definition and/or meaning of the terms "processor" or "database".

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. An automated teller machine (ATM), comprising:
    a processor;
    a speaker coupled to the processor;
    a communication interface coupled to the processor;
    a display coupled to the processor and providing a graphical user interface; and
    an ATM keypad comprising a plurality of keys coupled to the processor, wherein the plurality of keys comprising a first array of keys of a first type and a second array of keys of a second type;
    wherein the processor is configured to:
        in response to a setting to disable an accessibility keypad mode, operate a session in a standard keypad mode in which a first set of actions is mapped to the keys of the keypad;
        in response to a setting to enable the accessibility keypad mode, operate the session in the accessibility keypad mode in which a second set of actions is mapped to the keys of the keypad, wherein the second set of actions is different from the first set of actions, wherein the second set of actions comprises:
            actions for navigation and input selection of the graphical user interface, actions for control of audio being reproduced, actions for control of volume of the audio being reproduced, and actions for control of a rate of reproduction of the audio being reproduced which are mapped to keys of the first array of keys of the ATM keypad; and
            an action for ending the session, an action for returning to a previous page in the session, an action for selecting an option selected with an onscreen indicator, and an action for reproducing audio instructions for the accessibility keypad mode which are mapped to keys of the second array of keys of the ATM keypad;
        in the standard keypad mode, perform an action in the first set of actions in response to input received by a respective key of the keypad; and
        in the accessibility keypad mode, perform an action in the second set of actions in response to input received by a respective key of the keypad.

2. The ATM of claim 1, wherein the actions for navigation and input selection of the graphical user interface comprise scroll up, scroll down, scroll left, scroll right and select.

3. The ATM of claim 1, wherein the actions for control of audio being reproduced comprises one or more of repeat audio, skip audio, or pause audio reproduction.

4. The ATM of claim 1, wherein the actions for control of volume of the audio being reproduced increase volume of the audio being reproduced and decrease volume of the audio being reproduced.

5. The ATM of claim 1, wherein the actions for control of a rate of reproduction of the audio being reproduced comprises one or more of increase speed of audio reproduction or decrease speed of audio reproduction.

6. The ATM of claim 1, wherein the actions of the second set of actions of the accessibility keypad mode are dependent on context.

7. The ATM of claim 6, wherein the context is a current transaction or current screen of the session.

8. The ATM of claim 1, wherein the keys of the first array are arranged in a 4×3 array of rows and columns and the keys of the second array are arranged in a 4×1 array of rows and columns.

9. The ATM of claim 1, wherein the processor is configured to:
extract data from an authentication device in communication with the ATM;
send a signal including the data extracted from the authentication device to a server via the communication interface of the ATM; and
in response to receipt of a response signal from the server via the communication interface of the ATM, the response signal providing information identifying an account associated with the authentication device and accessibility options for the account including a setting whether the accessibility keypad mode is enabled or disabled, automatically apply the accessibility options on the ATM.

10. The ATM of claim 9, wherein the accessibility options comprise an audio reproduction option for enabling reproduction of audio associated with screens of the graphical user interface and the accessibility keypad mode option for enabling the accessibility keypad mode.

11. The ATM of claim 10, wherein the accessibility options further comprise a display option for the graphical user interface, wherein the display option for the graphical user interface is selected from the group consisting of a blank screen, screens comprising text and a background image, screens comprising white text and a black background, screens comprising black text and a white background, or screens comprising yellow text and a black background.

12. The ATM of claim 11, wherein the accessibility options further comprise a brightness option for the graphical user interface and a text size option for the graphical user interface.

13. The ATM of claim 1, wherein the display comprises a touchscreen, wherein the graphical user interface displayed on the touchscreen is configured to receive navigation and selection input from both the touchscreen and the keypad.

14. The ATM of claim 1, wherein the graphical user interface comprises a plurality of interconnected screens, wherein each of the interconnected screens comprises an accessibility button for invoking an accessibility options interface for configuring the accessibility options.

15. The ATM of claim 14, wherein the accessibility option is provided by an onscreen button located in a horizontal toolbar located at a bottom of each of the interconnected screens of the graphical user interface.

16. The ATM of claim 1, wherein the setting to disable an accessibility keypad mode or the setting to enable the accessibility keypad mode is provided by input received by the ATM.

17. An automated teller machine (ATM), comprising:
a processor;
a speaker coupled to the processor;
a communication interface coupled to the processor;
a display coupled to the processor and providing a graphical user interface; and
an ATM keypad comprising a plurality of keys coupled to the processor, wherein the plurality of keys comprising a first array of keys of a first type and a second array of keys of a second type;
wherein the processor is configured to:
in a standard keypad mode in which a first set of actions is mapped to the keys of the keypad, perform an action in the first set of actions in response to input received by a respective key of the keypad; and
in an accessibility keypad mode in which a second set of actions is mapped to the keys of the keypad, perform an action in the second set of actions in response to input received by a respective key of the keypad, wherein the second set of actions is different from the first set of actions, wherein the second set of actions comprises:
actions for navigation and input selection of the graphical user interface, actions for control of audio being reproduced, actions for control of volume of the audio being reproduced, and actions for control of a rate of reproduction of the audio being reproduced which are mapped to keys of the first array of keys of the ATM keypad; and
an action for ending a current session, an action for returning to a previous page in the current session, an action for selecting an option selected with an onscreen indicator, and an action for reproducing audio instructions for the accessibility keypad mode which are mapped to keys of the second array of keys of the ATM keypad.

18. The ATM of claim 17, wherein the ATM is operated in the standard keypad mode or accessibility keypad mode in response to a setting to disable an accessibility keypad mode or a setting to enable the accessibility keypad mode, respectively, wherein the setting to disable an accessibility keypad mode or the setting to enable the accessibility keypad mode is provided by input received by the ATM or provided by a response signal from a server via the communication interface of the ATM.

19. An automated teller machine (ATM), comprising:
a processor;
a speaker coupled to the processor;
a communication interface coupled to the processor;
a display coupled to the processor and providing a graphical user interface; and
an ATM keypad comprising a plurality of keys coupled to the processor, the plurality of keys comprising a first array of keys of a first type and a second array of keys of a second type, wherein the keys of the first array are arranged in a 4×3 array of rows and columns and the keys of the second array are arranged in a 4×1 array of rows and columns;
wherein the processor is configured to:
in response to a setting to disable an accessibility keypad mode, operate in a standard keypad mode in which a first set of actions is mapped to the keys of the keypad;

in response to a setting to enable the accessibility keypad mode, operate in the accessibility keypad mode in which a second set of actions is mapped to the keys of the keypad, wherein the second set of actions is different from the first set of actions, wherein the second set of actions comprises actions for navigation and input selection of the graphical user interface, actions for control of audio being reproduced, actions for control of volume of the audio being reproduced, and actions for control of a rate of reproduction of the audio being reproduced which are mapped to keys of the first array of keys of the ATM keypad, wherein the position of each key in the first array is denoted by a position [i, j], wherein i is the row number from top to bottom of the ATM keypad, and j is the column number from left to right of the first array of the ATM keypad, wherein the navigation and input selection actions comprise scroll up, scroll down, scroll left, scroll right and select for selecting an option selected with an onscreen indicator, wherein the scroll up action is mapped to the key in the [1,2] position of the first array, the scroll left action is mapped to the key in the [2,1] position of the first array, the scroll right action is mapped to the key in the [2,3] position of the first array, the scroll down action is mapped to the key in the [3,2] position of the first array, and the select action is mapped to the key in the [2, 2] position of the first array, wherein the second set of actions comprises an action for ending the session, an action for returning to a previous page in the session, an action for selecting an option selected with an onscreen indicator, and an action for reproducing audio instructions for the accessibility keypad mode which are mapped to keys of the second array of keys of the ATM keypad;

in the standard keypad mode, perform an action in the first set of actions in response to input received by a respective key of the keypad; and in the accessibility keypad mode, perform an action in the second set of actions in response to input received by a respective key of the keypad.

20. The ATM of claim 19, wherein the actions for control of audio being reproduced comprises one or more of repeat audio, skip audio, or pause audio reproduction.

21. The ATM of claim 19, wherein the actions for control of volume of the audio being reproduced increase volume of the audio being reproduced and decrease volume of the audio being reproduced.

22. The ATM of claim 19, wherein the actions for control of a rate of reproduction of the audio being reproduced comprises one or more of increase speed of audio reproduction or decrease speed of audio reproduction.

23. The ATM of claim 19, wherein the actions of the second set of actions of the accessibility keypad mode are dependent on context.

24. The ATM of claim 23, wherein the context is a current transaction or current screen.

25. The ATM of claim 19, wherein the processor is configured to:

extract data from an authentication device in communication with the ATM;

send a signal including the data extracted from the authentication device to a server via the communication interface of the ATM; and in response to receipt of a response signal from the server via the communication interface of the ATM, the response signal providing information identifying an account associated with the authentication device and accessibility options for the account including a setting whether the accessibility keypad mode is enabled or disabled, automatically apply the accessibility options on the ATM.

26. The ATM of claim 25, wherein the accessibility options comprise an audio reproduction option for enabling reproduction of audio associated with screens of the graphical user interface and the accessibility keypad mode option for enabling the accessibility keypad mode.

27. The ATM of claim 26, wherein the accessibility options further comprise a display option for the graphical user interface, wherein the display option for the graphical user interface is selected from the group consisting of a blank screen, screens comprising text and a background image, screens comprising white text and a black background, screens comprising black text and a white background, or screens comprising yellow text and a black background.

28. The ATM of claim 26, wherein the accessibility options further comprise a brightness option for the graphical user interface and a text size option for the graphical user interface.

29. The ATM of claim 19, wherein the display comprises a touchscreen, wherein the graphical user interface displayed on the touchscreen is configured to receive navigation and selection input from both the touchscreen and the keypad.

30. The ATM of claim 19, wherein the graphical user interface comprises a plurality of interconnected screens, wherein each of the interconnected screens comprises an accessibility button for invoking an accessibility options interface for configuring the accessibility options.

31. The ATM of claim 30, wherein the accessibility option is provided by an onscreen button located in a horizontal toolbar located at a bottom of each of the interconnected screens of the graphical user interface.

32. The ATM of claim 26, wherein the setting to disable an accessibility keypad mode or the setting to enable the accessibility keypad mode is provided by input received by the ATM.

33. An automated teller machine (ATM), comprising:

a processor;

a speaker coupled to the processor;

a communication interface coupled to the processor;

a display coupled to the processor and providing a graphical user interface; and an ATM keypad comprising a plurality of keys coupled to the processor, the plurality of keys comprising a first array of keys of a first type and a second array of keys of a second type, wherein the keys of the first array are arranged in a 4×3 array of rows and columns and the keys of the second array are arranged in a 4×1 array of rows and columns;

wherein the processor is configured to:

in a standard keypad mode in which a first set of actions is mapped to the keys of the keypad, perform an action in the first set of actions in response to input received by a respective key of the keypad; and in an accessibility keypad mode in which a second set of actions is mapped to the keys of the keypad, perform an action in the second set of actions in response to input received by a respective key of the keypad, wherein the second set of actions is different from the first set of actions, wherein the second set of actions comprises actions for navigation and input selection of the graphical user interface, actions for control of audio being reproduced, actions for control of volume of the audio being reproduced, and actions for control of a rate of reproduction of the audio being reproduced which are mapped to keys of the first array of keys of the ATM keypad, wherein the position of each key in the first array is denoted by a position [i, j], wherein i is the row number from top to bottom of the ATM keypad, and j is the column number from left to right of the first array of the ATM keypad, wherein the navigation and input selection actions comprise scroll up, scroll down, scroll left, scroll right and select for selecting an option selected with an onscreen indicator, wherein the scroll up action is mapped to the key in the [1,2] position of the first array, the scroll left action is mapped to the key in the [2,1] position of the first array, the scroll right action is mapped to the key in the [2,3] position of the first array, the scroll down action is mapped to the key in the [3,2] position of the first array, and the select action is mapped to the key in the [2, 2] position of the first array, wherein the second set of actions comprises an action for ending the session, an action for returning to a previous page in the session, an action for selecting an option selected with an onscreen indicator, and an action for reproducing audio instructions for the accessibility keypad mode which are mapped to keys of the second array of keys of the ATM keypad;

in the standard keypad mode, perform an action in the first set of actions in response to input received by a respective key of the keypad; and in the accessibility keypad mode, perform an action in the second set of actions in response to input received by a respective key of the keypad.

34. The ATM of claim 33, wherein the ATM is operated in the standard keypad mode or accessibility keypad mode in response to a setting to disable an accessibility keypad mode or a setting to enable the accessibility keypad mode, respectively, wherein the setting to disable an accessibility keypad mode or the setting to enable the accessibility keypad mode is provided by input received by the ATM.

35. The ATM of claim 33, wherein the ATM is operated in the standard keypad mode or accessibility keypad mode in response to a setting to disable an accessibility keypad mode or a setting to enable the accessibility keypad mode, respectively, wherein the setting to disable an accessibility keypad mode or the setting to enable the accessibility keypad mode is provided by a response signal from a server via the communication interface of the ATM.

* * * * *